United States Patent [19]

Neeves et al.

[11] Patent Number: 5,504,608

[45] Date of Patent: Apr. 2, 1996

[54] ADJUSTABLE FILTER FOR TUNING MULTIMODE OPTICAL SIGNALS

[75] Inventors: Arthur E. Neeves, Morristown; William E. Watters; James E. Williams, both of Hackettstown, all of N.J.

[73] Assignee: AT&T Corp., Murray Hill, N.J.

[21] Appl. No.: 450,514

[22] Filed: May 25, 1995

[51] Int. Cl.[6] .................................................. H04J 14/02
[52] U.S. Cl. ......................... 359/124; 359/161; 359/891; 250/226
[58] Field of Search .................................. 359/124, 127, 359/159, 161, 193, 891; 250/226; 333/167

[56] References Cited

U.S. PATENT DOCUMENTS

| | | | |
|---|---|---|---|
| 4,243,882 | 1/1981 | Yasujima et al. | 250/339.06 |
| 4,813,756 | 3/1989 | Frenkel et al. | 359/127 |
| 4,824,205 | 4/1989 | Yamashita et al. | 385/104 |

Primary Examiner—Leo Boudreau
Assistant Examiner—Kinfe-Michael Negash

[57] ABSTRACT

This invention provides an apparatus and a method of filtering a MM Wavelength Division Multiplexed (WDM) signal operating in the 1548 to 1560 nm region. The wavelengths of the MM are spaced 1–12 nm apart and centered about 1558 nm. The adjustable filters for tuning MM optical signals encompass a carousel and a mechanical system for positioning one of the filters in the path of the MM WDM signal and tracking the signal. An algorithm controls the mechanical system for tracking and positioning one of the filters in the path of the MM WDM signal. The filter in position filters one of a plurality of wavelengths and tunes the filter to compensate for temperature changes.

32 Claims, 16 Drawing Sheets

FIG. 8

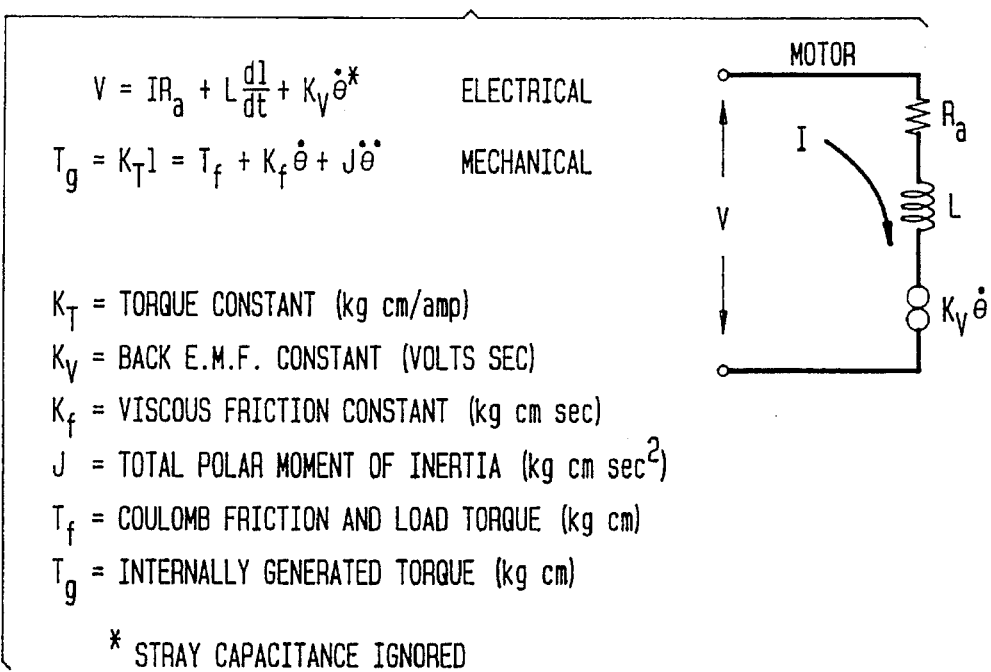

$$V = IR_a + L\frac{dI}{dt} + K_V\dot{\theta}^*  \quad \text{ELECTRICAL}$$

$$T_g = K_T I = T_f + K_f\dot{\theta} + J\ddot{\theta} \quad \text{MECHANICAL}$$

$K_T$ = TORQUE CONSTANT (kg cm/amp)
$K_V$ = BACK E.M.F. CONSTANT (VOLTS SEC)
$K_f$ = VISCOUS FRICTION CONSTANT (kg cm sec)
$J$ = TOTAL POLAR MOMENT OF INERTIA (kg cm sec$^2$)
$T_f$ = COULOMB FRICTION AND LOAD TORQUE (kg cm)
$T_g$ = INTERNALLY GENERATED TORQUE (kg cm)

* STRAY CAPACITANCE IGNORED

FIG. 9

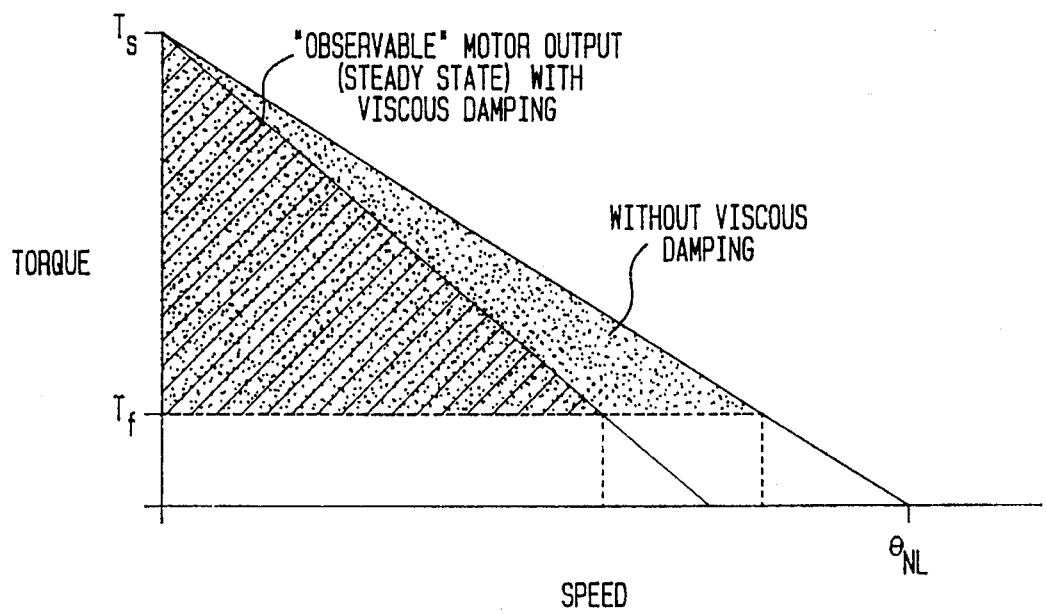

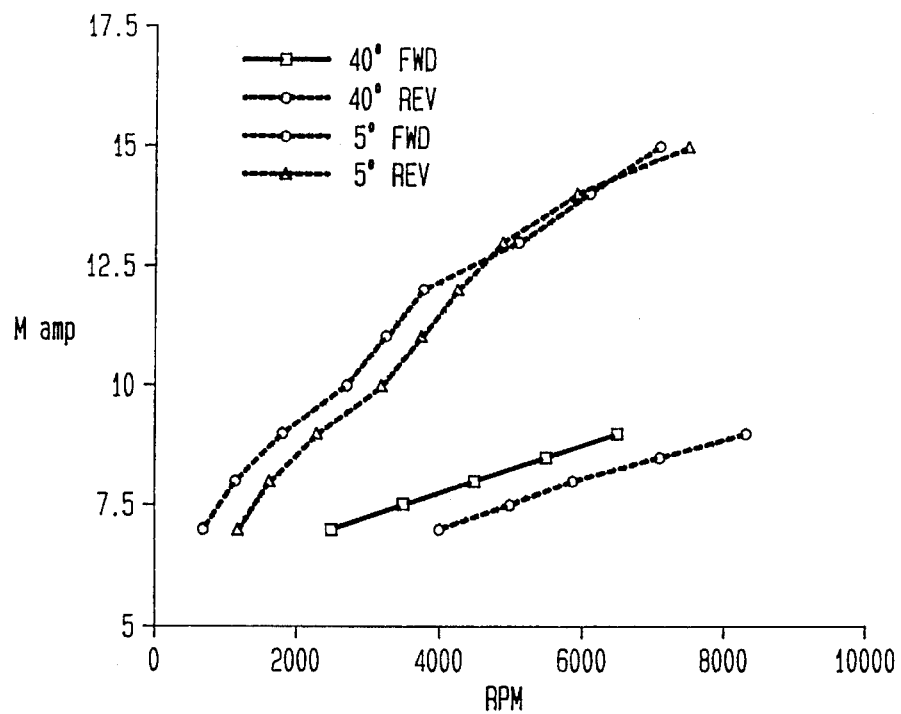
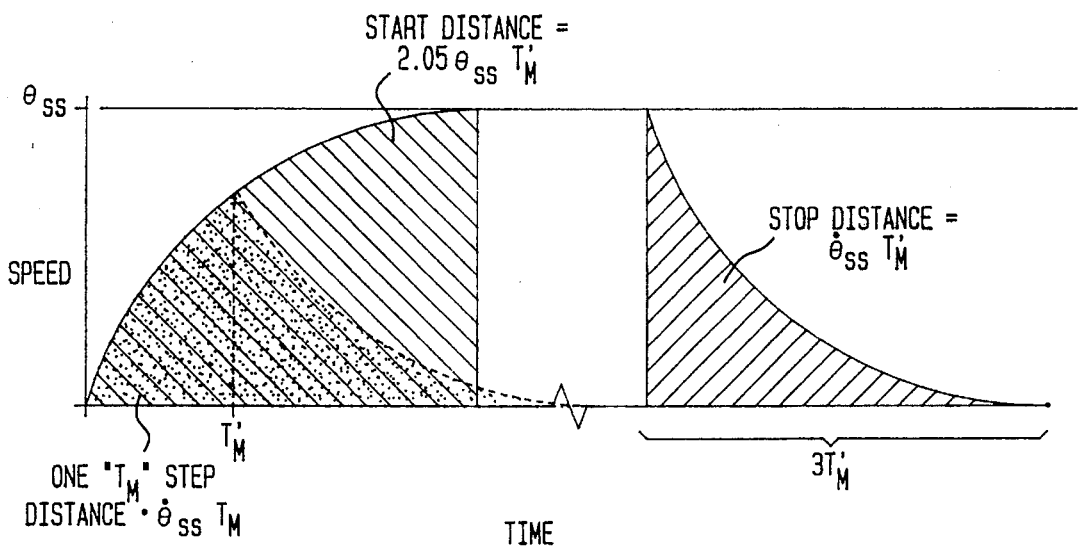

ADJUSTABLE FILTER FOR TUNING MULTIMODE OPTICAL SIGNALS

GOVERNMENT CONTRACT

This invention was made with support from the Government of the United States under a contract. The U.S. Government has certain rights in this invention.

FIELD OF THE INVENTION

This invention relates to optical communications systems; specifically to systems having one or more Multimode (MM) optical signals and methods of filtering the MM signals.

BACKGROUND OF THE INVENTION

A filter element for filtering MM optical signals may be a multilayer thin-film device that relies on the interference of multiple reflected beams from a stack of quarter-wave dielectric layers of alternate high and low refractive index. Incident light undergoes multiple reflections between the coated layers which define the cavity. When the beams reflected from all the interfaces in the assembly are of equal phase at the front surface they combine constructively, i.e., whenever there is no phase difference between the emerging wavefronts, interference produces a transmission maximum.

A typical prior art filter construction for a narrow (1 nm) bandpass filter is shown in FIG. 1. This filter consists of two or three cavities back-to-back to provide steeper band slope, improved near band rejection, and "square" passband peaks. Each cavity consists of 21 layers of alternate high and low index material. These may be soft coating material such as zinc sulfide ZnS and cryolite $Na_3AlF_6$ or hard coating material such as $Ta_2O_5$ and $SiO_2$.

To use an interference filter to filter a signal from a fiber, the fiber output should be collimated. This is accomplished by using a beam expander device which may be constructed with either aspheric or GRIN (Graded Index) lenses as shown in FIG. 2 and inserting the interference filter element in the collimated beam. In the case of a SM (single mode) input signal the collimation is very effective and the interference filter behaves as though the source is perfectly collimated. The situation for a MM source which is not perfectly collimated is considerably more complex. Due to a number of modes in the MM fiber a single lens element cannot perfectly collimate the fiber output. This results in the beam having a distribution of angles for any filter position.

It should be noted that since the output from a MM fiber source is not perfectly collimated it is important to minimize the separation distance between the collimating elements to avoid excessive signal loss in the beam expander device (see FIG. 2).

When using an interference filter to select a Wavelength Division Multiplexed (WDM) channel, the filter must be tunable over a given WDM wavelength range. Even though the interference filter element is designed for a given passband and a given wavelength for incident radiation at normal incidence, the interference filter passband may be tuned to shorter wavelengths by tilting the filter with respect to the incident radiation. When the tilt angle is small the major effect is in the phase thickness of the layers, which is affected equally for each plane of polarization. For larger tilts the admittances are also affected and then the performance for each plane of polarization differs.

When an interference filter is tuned by tilting the filter there is an associated loss penalty which depends on the degree of collimation of the incident radiation. The biggest limitation to use of the Bandpass (BP) Interference filter to filter MM WDM signals from a fiber is its excess loss due to tuning over the desired wavelength range of 1548 to 1560 nm (for Erbiun Doped Optically Amplified Systems). The BP filter tuning loss is much greater for a MM configuration because the MM beam is not perfectly collimated and the interference filters performance is optimum for incident plane waves. If non-parallel light is incident on a filter the peak transmittance is reduced, the bandpass is broadened, the center wavelength is shifted, and the spectrum becomes asymmetric.

FIG. 3 shows the filter angle and total induced loss as a function of tuning away from the center wavelength. The filter input is a MM source with a 100/140 μm MM fiber on a WDM system. The filter uses an aspheric type beam expander and dual cavity 1 nm BP filter element with a center wavelength of 1550 nm. The gap spacing in the beam expander, i.e., the distance between lens elements, is preferably set to 12.5 mm.

The excess tuning loss may be minimized by reducing the wavelength range over which the filter must be tuned. This may be accomplished by providing multiple filters to limit the range over which each filter element must be tuned as in the present invention.

SUMMARY OF THE INVENTION

The adjustable bandpass filters of the present invention filter MM WDM signals having channel spacings from around 1.5 nm to 12 nm. The bandpass filters are built around a commercially available symmetric beam expander. This unit employs a conventional GRIN lens to expand the signal in the multimode pigtail to a nearly collimated, one millimeter diameter cylindrical pattern, which is launched through an eight millimeter air gap. The residual light is recaptured in an identical GRIN lens multimode pigtail assembly.

The apparatus for filtering MM WDM optical signals includes a carousel of seven filter elements with different center wavelengths which may be rotated about an axis for incremental tuning (~2 nm) and switching functions to provide a larger tuning range (~12 nm). A control program is executed to control the filter mechanism to tune the wavelength that contains the desired information.

In particular, the present invention limits the filter tuning range to 2 nm per filter element with seven elements having design wavelengths of 1560, 1558, 1556, 1554, 1552, 1550, and 1548 nm and limits the excess tuning loss to ~1 dB while maintaining the maximum insertion loss less than 4 dB when the mechanical filter tilt angle is limited to the 0° to 7° range (see FIG. 4).

BRIEF DESCRIPTION OF THE DRAWINGS

FIG. 8 illustrates the circuit used for determining the governing equations for motors of the permanent magnet D.C. type.

FIG. 9 is a diagram showing the steady state torque versus speed characteristics.

FIG. 10 is a diagram showing the evaluation of the fixed or "coulomb" friction results from both the gear box and motor brush drag.

FIG. 11 is a diagram illustrating the computation of the values for $K_w$ and $T_f$, basic start, stop and single "on pulse" distances.

DETAILED DESCRIPTION OF THE PREFERRED EMBODIMENT

Figure 1:
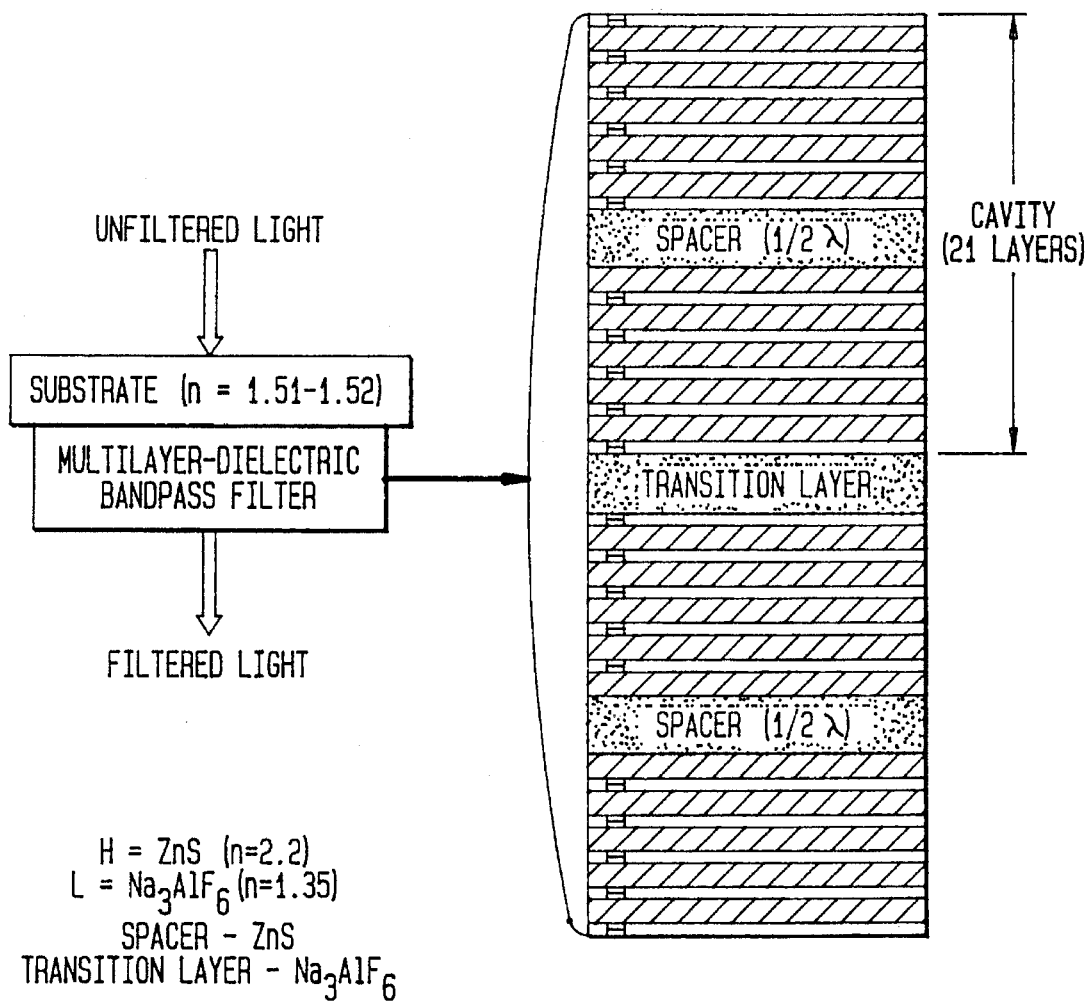
FIG. 1 is a diagram of a two stage bandpass interference filter construction.
Figure 2:
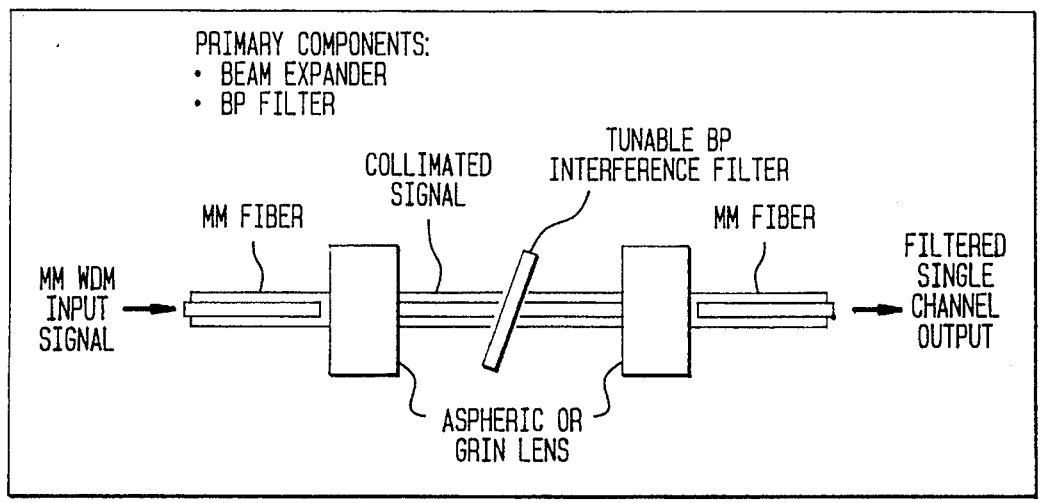
FIG. 2 is a schematic representation of a tunable BP filter construction.
Figure 3:
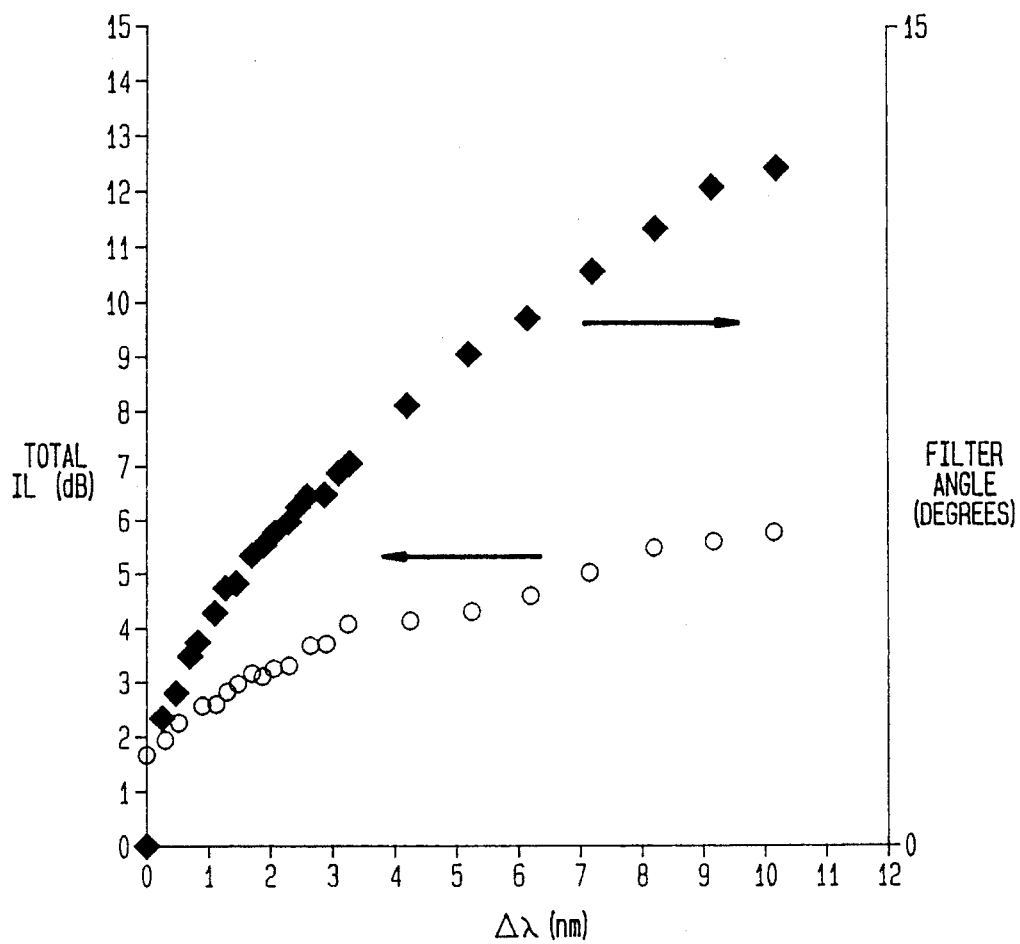
FIG. 3 is a graph illustrating the total filter induced loss as a function of tuning from the filter center wavelength (1550 nm) for a MM fiber design.
Figure 4:
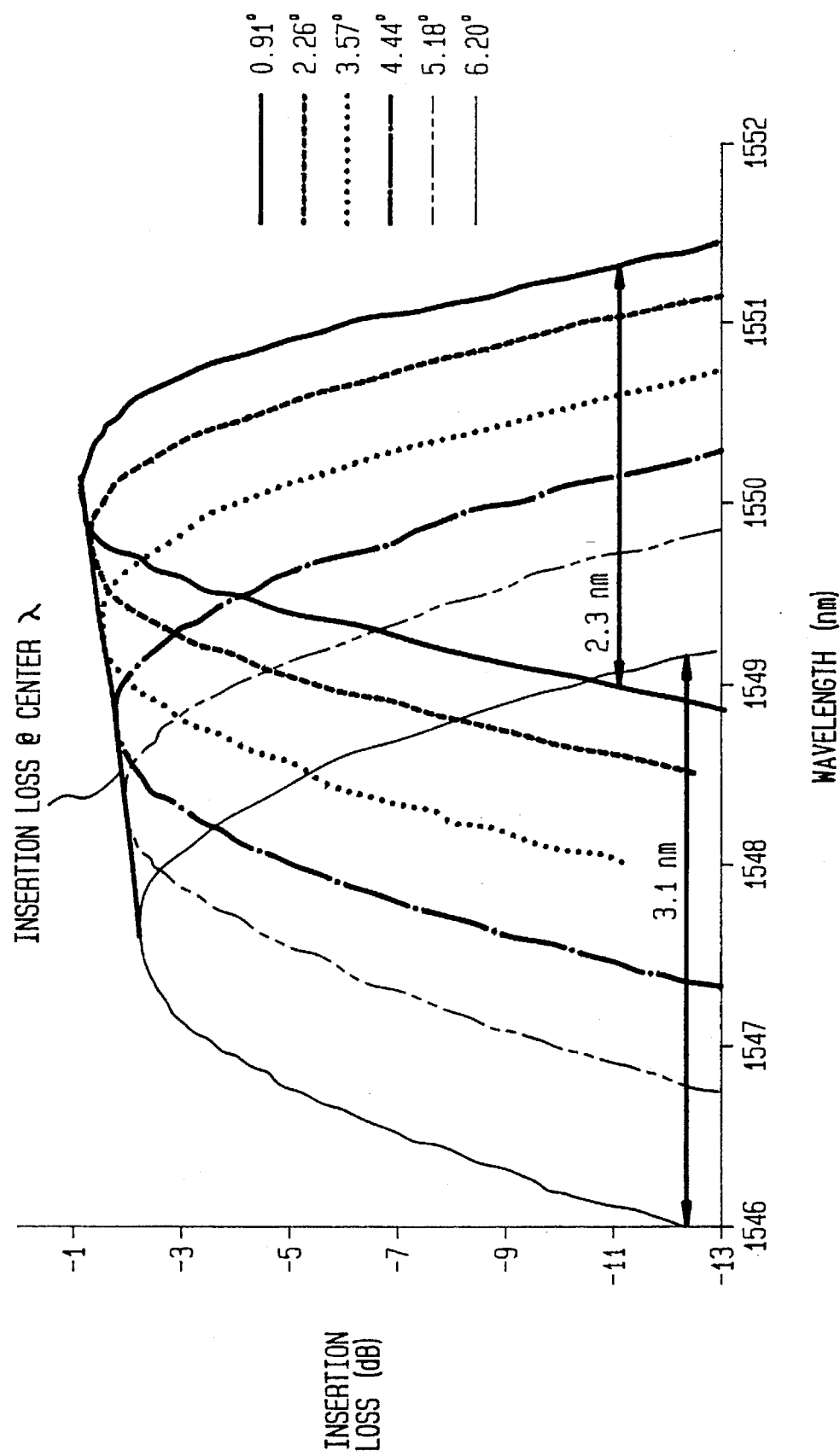
FIG. 4 illustrates typical performance of one OCLI filter element at several tilt angles in combination with a beam expander.
Figure 5:
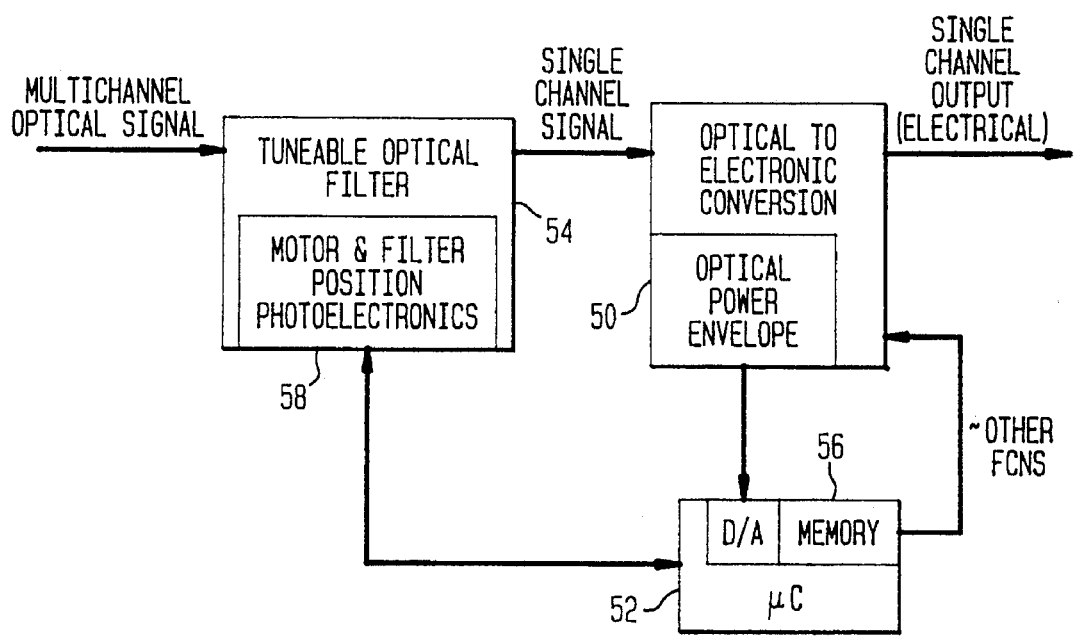
FIG. 5 is a block diagram illustrating the "closed loop" approach.

According to a preferred embodiment of the present invention, a "closed loop" approach is used to implement the adjustable filter for tuning the bandpass region of multimode optical signals, i.e., the multi-mode tunable bandpass filter (MMTBPF). For example, as illustrated in FIG. 5, the short term average optical power 50 or the MMTBPF optical output signal envelope is sampled by the microcontroller 52 and used during the tuning process by the tunable optical filter 54 to peak this output signal 50. The microcontroller 52 includes a memory module 56 having associated stored programs for tracking and tuning the optical signals. Therefore, the MMTBPF permits the isolation and extraction of any one channel (color) from close spaced (two nanometer) Wavelength Division Multiplexed (WDM) signals output from a multimode source.

The MMTBPF position photoelectronics of the present invention are controlled by the microcontroller 52. Controller algorithms assist in filter element selection and provide a single tilt position reference points.

The controller algorithms provide the ability to:

(a) Scan over a region of the wavelength spectrum to see if any WDM signal peaks are present.

(b) Tune to any observed peak.

(c) Reasonably estimate the wavelength of a signal peak.

(d) Track the tuned peak without losing the signal should the signal or MMTBPF drift due to temperature changes.

The "closed loop" arrangement provides several advantages, the more important of which are:

1. direct feedback measurement of optical power to confirm (in real time at system level) that adequate tuning has been accomplished.

2. Real time monitoring to detect WDM transmission system shifts or TBPF shifts due to temperature changes.

3. The optical envelope power measurement is either already available in the system hardware or easily obtainable.

4. Elimination of high resolution position readout devices within the TBPF.

The BP interference filter of a preferred embodiment is mounted in a mechanical fixture which provides angular rotation capabilities for filter tuning over a 2 nm range and switching capabilities to increase the total tuning to cover the expected WDM system wavelength window. The BP filter includes seven 1 nm dual cavity filter elements mounted in a rotating fixture to provide tuning from 1.560 μm to 1.552 μm. Exemplary design characteristics are listed below:

Tuning Angle ~6°

Switching Capability For Seven Filter Elements Having Wavelengths Spaced 2 nm Apart (1560, 1558, 1556, 1554, 1552, 1550 and 1548 nm)

Tuning Resolution =0.01 nm

Compensation for Tuning Point Drift

The MMTBPF has several capabilities, including:

1. Tracking or "re-peaking" without losing a tuned signal to correct for temperature induced tuning point drift.

2. Observing a shift in signal peak due to mechanically scanning or tilting the filter and compensation techniques.

3. Estimating tuning point wavelength.

4. Compensating for errors due to temperature or scan induced shift.

The MMTBPF is built around a commercially available symmetric beam expander. This unit employs a conventional GRIN lens to expand the signal in the multimode pigtail to a nearly collimated, one millimeter diameter cylindrical pattern, which is launched through an eight millimeter air gap. The residual light is recaptured in an identical GRIN lens multimode pigtail assembly.

The wavelength tunable feature is provided by placing a narrow bandpass optical filter element in the beam expander air gap and tilting it relative to the beam expander optical axis to achieve fine tuning. The optical filter element is a two cavity, multi-layer interference type, manufactured by OCLI using hard coat technology.

The major performance points to note are:

1. The total optical loss including the beam expander is less than 4 dB when the mechanical filter tilt angle is limited to the 0° to 7° range.

2. Then tunable range for a single filter element is about three nanometers over a 0° to 7° tilt range.

3. The full width optical filter bandwidth at the −10 dB point is less than three nanometers (at 6°) which will support extraction of individual channels from Wavelength Division Multiplexed channels spaced at about 1.6 nm.

The desired tuning range which is 1548 to 1560 nm is provided by arranging seven filter elements spaced at appropriate wavelengths and arranged such that any one filter element can be positioned in the beam expander air gap and tilted to scan over and tune to any point in its individual tuning range.

The basic design consists of a carousel disk, which contains the seven individual filter elements, any one of which can be positioned on the beam expander optical axis (in the air gap). A tilt feature is arranged such that the tilt axis passes through both the beam expander optical axis and the active surface of the 5 nm diameter filter element positioned for use. This permits the pure tilting of the selected filter without translating it.

The general mechanical arrangement is such that the beam expander is secured to the stationary base. In this manner, its optical pigtails need not flex or move. As such the only moving optical components are the filter elements in the beam expander air gap during selection or tilting to scan or track a signal. Normally, once a filter has been selected and a signal scanned and acquired, both actuator motors are shut down as are the two code wheel electro optical position systems. As such nothing is moving and the electrical power consumption is zero. During tuning operations, the maximum power dissipation in the MMTBPF is less than 300 milliwatts.

The carousel disk with seven filter elements is direct drive powered by a miniature d.c. permanent magnet gear motor with a reduction ratio of 1770:1. This Portescap 3 v d.c. gear motor is always operated in the full on or off state by switching fixed supply voltage to the motor or shorting the (dynamic braking) motor for the off state. The internal 7500 RPM motor produces a full cycle carousel period of about 14.2 seconds.

The carousel rotating axis is offset such that the center of the selected filter element can be positioned on the center of the expanded signal beam. The tilt bracket carrying the carousel with multiple filter elements is arranged so that the tilt axis passes through the center of the selected filter element. This minimizes filter element translation during tuning rotation.

The tilt bracket is mounted to a rigid chassis via miniature ball bearings which are spring-loaded to eliminate both radial and axial play. Further, the filter carousel is spring-loaded against a reference surface in the tilt bracket to eliminate any play in a direction that could produce unwanted "tilt". There is no attempt to make either the bracket tilt motion or carousel rotation friction free. On the contrary, it will be shown below that a small amount of rotational friction in each is needed for two reasons.

The tilt bracket is driven by a second Portescap 1770:1 gear motor in a cam drive arrangement. A number of cam profiles are possible and include:

1. A custom cam profile producing a 6° bracket tilt that is linear over, say, 270° of cam rotation with the remaining 90° used for flyback.

2. A custom cam profile producing a tilt that results in a linear relationship between tuned wavelength and cam rotation for any "average" selected filter element. This approach (like 1. above) is expensive in machining complexity to minimize controller computational load.

3. A mechanically simple eccentric circle which can be made mechanically precise but imposes a heavier computational load on the controller and slightly reduces useable filter tuning range.

Approach 3. was implemented in the algorithms (and associated software) described later. As such, an additional average "gear ratio" of about 30:1 (representing the cam driving the tilt assembly through 6° for 180° of cam rotation) is inserted between the gear motor and tilted filter.

The preferred tilt drive motor drives the cam clockwise or counter-clockwise to preserve the ability to track a signal power peak without losing it. With large temperature swings and depending on the tuned wavelength, tracking could be interrupted by the need to switch filters.

As will be seen later, filter element tuning range overlap will be used to provide a reasonable temperature tracking range without the need to switch filter elements.

At this point, attention is called to the fact that both carousel and filter tilt drives are bi-directional drives of a continuous cyclic nature with no hard limit stops. As such, the driven loads can impose on the gear motor only those torques associated with load coulomb and viscous friction plus load inertia acceleration. The importance of this will become evident below in the discussion of drive dynamic analysis.

Figure 6:
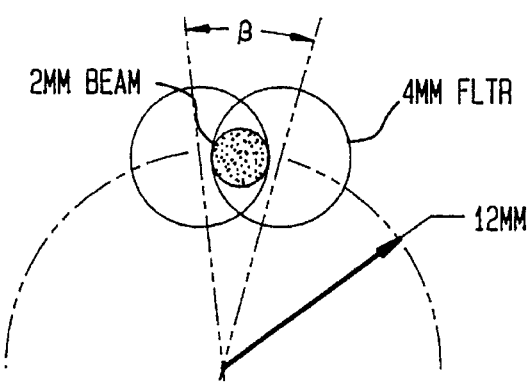
FIG. 6 is a diagram illustrating rotation of a 5 mm tunable filter within its positioning arc.
Figure 14:
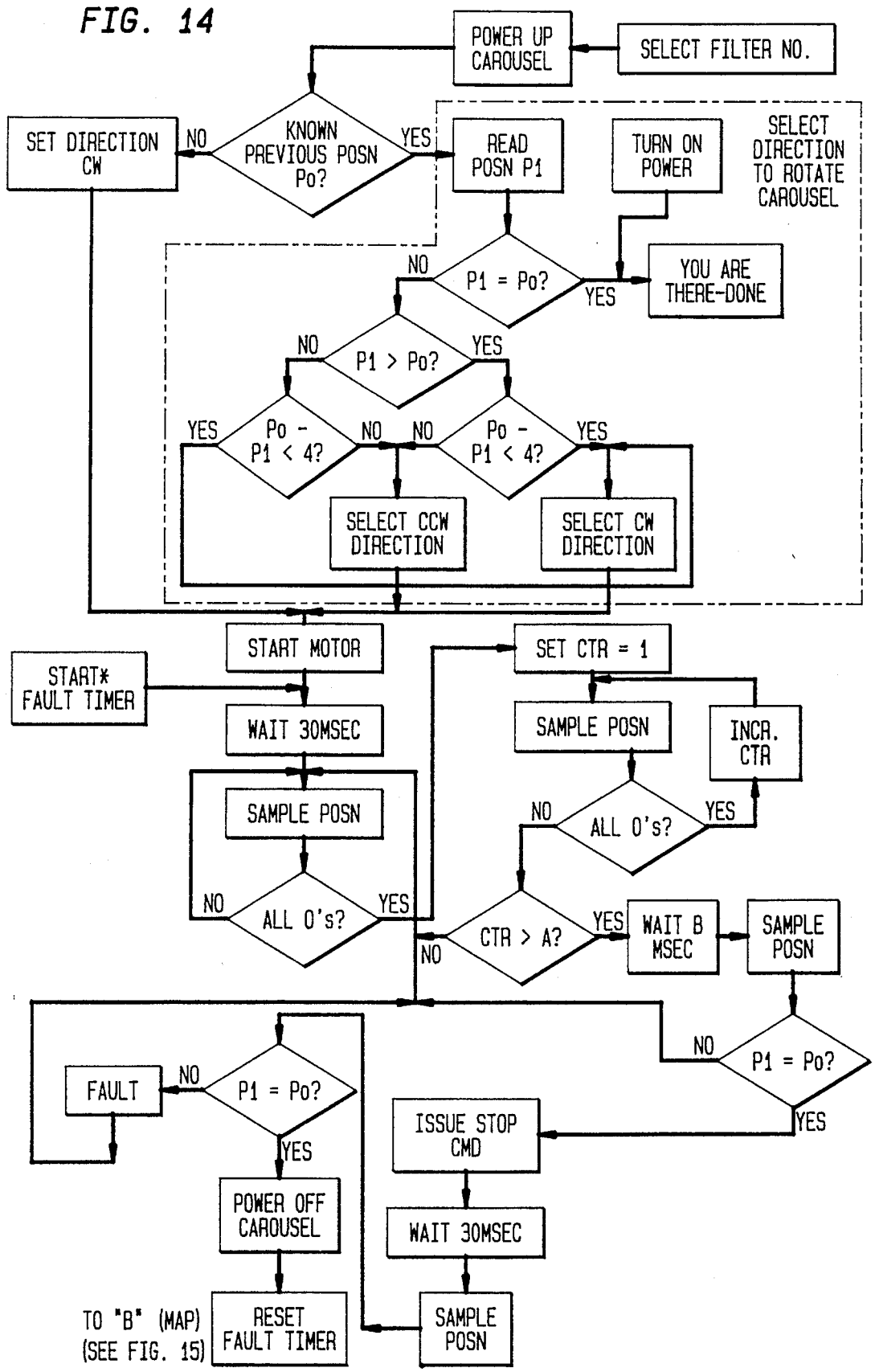
FIG. 14 is a flowchart of the cam drive algorithm with the code wheel bit deskew module.

The carousel positions a filter element so that a fixed diameter optical beam, a maximum of around two millimeters, can pass through. A 5 mm diameter filter is used and typically a residual 4 mm diameter clear "window frame" is rotated through a two millimeter beam, as shown by FIG. 6. This relaxes the filter position accuracy to anywhere in a nine degree sector. The simple code wheel mounted to the rotating carousel provides "narrow slots" which "turn on" optical receivers by allowing passage of light from LED transmitters, thus, the "filter in position" can be sensed. It will be shown later that the carousel can be stopped within less than 0.5° from full speed (slew) motor conditions. Therefore, by insuring the "filter in position" slots are comfortably greater than 0.5° and centered in the allowable nine degree window, the filter selection process is reduced to the steps as shown in FIG. 14 and outlined below:

If the desired filter is not in position, start the carousel drive motor in either direction.

When the selected filter's optical receiver turns on, issue a motor stop command.

After allowing about 30 msecs motor stop time, which is about three time constants, check to see that the selected filter is still "in position", i.e., its optical receiver is still on.

The selected filter is "in position", the motor motion is completed, the process is complete and both motor drive circuit and photoelectronic power can be removed to conserve energy. Of course, power may have to be maintained until tilt adjustments are completed.

Note that in accommodating the controller delay and motor stop distance, the design places the selected filter well within its allowable nine degree band and, afterwards, provides a static electronic logic level or status that "such is so".

For filter element selection involving seven elements, three LED transmitters and optical receiver pairs are employed. Encoding requires seven filter states plus one "between filters" state or eight states. The carousel disk with seven filter elements is direct drive powered by a miniature d.c. permanent magnet gear motor with a reductions ratio of 1770:1, as noted above.

With the very large gear ratio, reflected load inertia is of the order of one eight thousandth of the internal gear motor inertia. Further, load friction torques are very small, resulting in run current averaging about 1 to 2 ma above measured internal motor friction. Typically, the run current is 10 ma, which is the advertised maximum no load current for the gear motor device by itself. Motion is then dominated by the gear motor itself with its 10 msec time constant.

The carousel filter positioning system operates by taking advantage of the following observations:

1. The carousel gear motor will stop the carousel in 0.24° from full slew speed.
2. A 10 msec controller delay adds an additional 0.24° resulting in a total carousel stop distance of about 0.5°.
3. The 4 mm diameter available window of the mounted 5 mm diameter filter allows a positioning range of 17° with respect to the 1 mm diameter beam expander pattern.
4. A simple, non-precision three bit code wheel is achievable to provide an "on position" indication covering about 4°, comfortably larger than the 0.5° stop distance and smaller than the 17° allowable range. The 4° "on" window can then be centered in the 17° range.

The basic carousel control scheme is, then, "run full speed until the selected filter is indicated then stop". The detailed algorithm is illustrated by the flow charts of FIGS. 14–19 and contains provisions to:

1. Employ a "smart" search which always takes the shortest direction from filter "i" to filter "j" to minimize total energy consumption. The current control software does not implement "smart" search, but uses unidirectional motion which results in an average filter select time of 7 seconds instead of 3.5 seconds achievable with the "smart search".
2. Employ electronic (time delay) deskewing of the three bits for avoiding false position indication during the "off" to "on" transitions.
3. Force recognition of multiple successive "000" readings (space between filters) while transitioning from any filter "i" to "j" to avoid "on" to "off" bit skew induced problems.
4. Power down the carousel code wheel electronics to conserve energy.

The current carousel has an eighth unequipped filter position as a development convenience to measure the optical state of health of the beam expander only. This position is not encoded. Such a window could be a convenient means to bypass narrow band filtering should that ever be needed in a final system.

Figure 7:
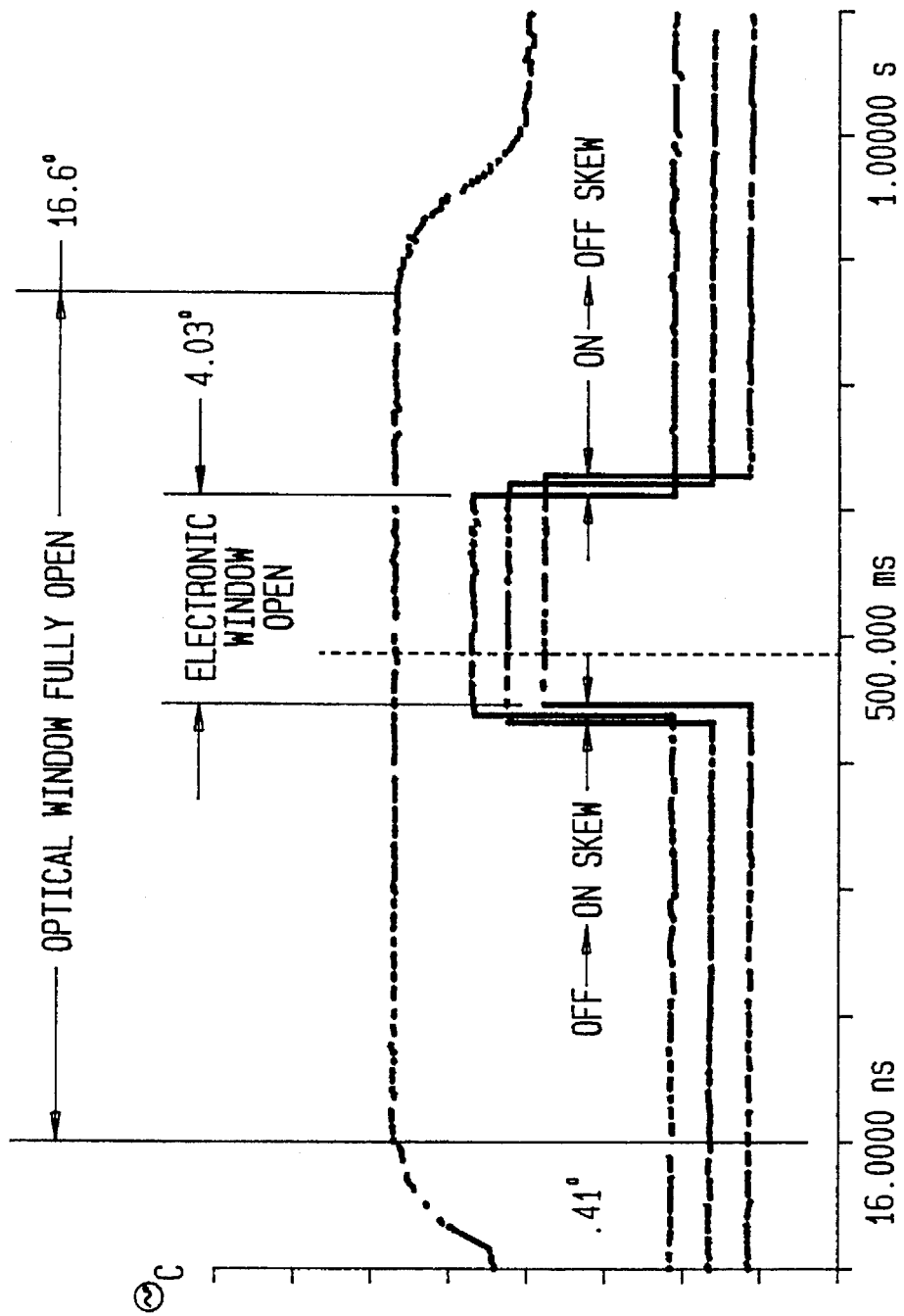
FIG. 7 illustrates the code wheel operation by displaying (at full slew speed) the three detected code wheel bit signals positioned inside of the analog optical power window formed by the rotating filter element passing through the beam expander beam.

FIG. 7 illustrates the code wheel operation by displaying (at full slew speed) the three detected code wheel bit signals positioned inside of the analog optical power window formed by the rotating filter element passing through the beam expander beam. Both "off" to "on" and "on" to "off" bit skew are evident and handled by the algorithm deskew delay.

A small friction drag brake which is set to about 0.5 inch ounces is provided to hold the code wheel in its selected position in the presence of angular acceleration up to 64 radius/sec$^2$. In addition, both axes have been equipped in anticipation of the presence of both translational and rotational vibration in the operational environment. Static balancing of both tilt and carousel axis is the primary approach to countering translational vibration.

As previously indicated, the entire carousel assembly is rotated about a tilt axis which provides pure rotation of the selected filter. The tilt drive employs another Portescap gear motor which is slightly larger than the carousel gear motor and is equipped with a right angle drive output which is directly coupled to the cam. The eccentric circle, ball bearing cam provides for filter tilting over a 1° to 7° range, the 1° minimum position limiting reflections to acceptable levels. The 7° position represents a reasonable allowable maximum loss (4 dB) operating point for the filter with a multimode source and is a practical physical limit.

The eccentric circle cam limits practical tilt to about 6.5° the remaining 0.5° being allocated to slowing down for the "turn around/flyback phase".

As for the carousel, the tilt drive is dominated by gear motor dynamics and runs essentially unloaded. This gear motor has a mechanical time constant of 8 milliseconds which is slightly faster than the carousel gear motor and a gear ratio of 1330:1.

Figure 20:
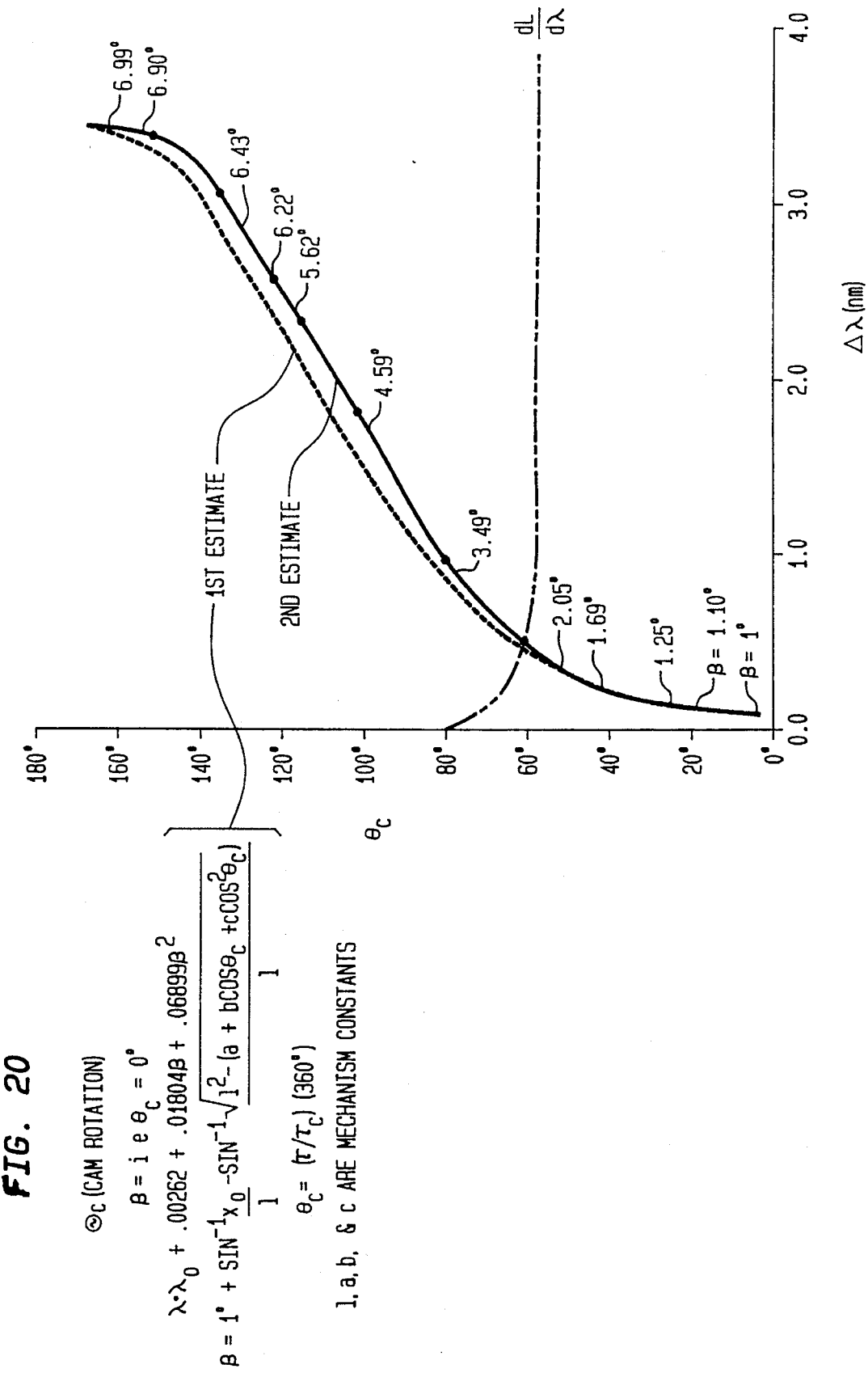
FIG. 20 illustrates the relationship between relative cam rotation (θ) and "relative" tuned wavelength for a "typical" filter element.

FIG. 20 illustrates the relationship between relative cam rotation (θ) and "relative" tuned wavelength for a "typical" filter element for which the wavelength—tilt angle (β) relation is given. Several values of the tilt angle β are indicated on the curve. The control firmware is designed to permit the down loading of the wavelength—tilt characteristics of each filter. As such, each filter element is calibrated in final assembly and the λ vs. β tuning coefficients are stored for accurate wavelength calculations.

It is noted that the individual filter element tuning coefficients and the calculation of tilt angle β have nothing to do with the ability of the MMTBPF to scan, detect a signal peak, position itself at the peak ("tune" to the peak) or track the peak should temperature induced changes occur. Filter tuning coefficients and the tilt angle β calculations are only used to estimate and report the wavelength of the "detected" optical signal peak. If the system can be modified so as to not need wavelength estimates, the control algorithm can be substantially simplified.

The cam drive is equipped with a one bit code wheel to define when the forward scan starts—which, for the moment, will be set at bottom dead center ($\theta_c=0°$ at minimum absolute tilt (β) of 1°). The code bit also indicates when the forward scan is complete, i.e., when the tilt has reached maximum usable angle of about 6.5°. The code bit is also used to inhibit sampling during "flyback".

Since the cam drive gear motor is running nearly unloaded, the cam angle $\theta_c$ is measured by noting the time from the code bit "off" to "on" transition relative to 360° cycle time. Speed changes due to environmental temperature changes, available voltage shifts or gear motor wear are compensated by the time ratio measurement. During the scan operation, the "location" of an observed signal peak is the time to the peak from 0° ("off" to "on" code bit transition) relative, of course, to the 360° cycle time. These timing measurements are always made at steady state, full slew speed conditions by the control algorithm and are used to tune to a signal peak detected during a scan pass.

The equation for tilt angle (β) shown in FIG. 20 is exact if the cam angle ($\theta_c$) is absolute. Unfortunately, $\theta_c$ is a relative measurement since the cam drive motor is mounted on the tilt assembly. The dashed curve represents the "first estimate" if this absolute vs. relative business is ignored. Errors of up to 0.2 nm are involved.

If the equation is used once to estimate β and the resulting value added to the measured, relative $\theta_c$ to estimate an absolute $\theta_c$, a second pass through the equation with the estimated absolute $\theta_c$ yields the solid curve. This second estimate is an extremely accurate estimate of the exact solution yielding errors less than 0.02 nm. The current control algorithm does exactly this to get an accurate measure of β from which the wavelength can be accurately estimated.

Using just the time to peak and total 360° cycle time, the MMTBPF can find and tune to individual close space WDM signals. Further, using the above tilt calculations (β), and stored filter element tuning coefficients, the numerical value of the tuned wavelength can be calculated and reported. Two additional factors affect the accuracy of the wavelength calculations. They are discussed below, but are as follows:

1. MMTBPF temperature drift (shift of tuned wavelength vs. cam angle due to temperature change).
2. Apparent (observed) peak wavelength shift due to mechanically scanning (filter tilt) a fixed optical wavelength.

Referring to FIG. 20, practical reasons limit the useful range of $\theta_c$ from about 35° to 140° which represents a tilt range of 1.5° to 6.5°. The cam code wheel is, therefore, set to fire at these points with the equation for β modified with the 35° offset. Below 35°, the rate of change of wavelength vs. $\theta_c$ is too slow to be of much use. The same is true much above 140°.

In both scan mode ("see what's there") and slew tuning mode ("go to and stop on" a peak observed in scan) the cam drive gear motor is operated in the full "on" or shorted mode, as is the carousel drive motor. With the 1330:1 gear ratio, the stop distance is about 0.04 nm (worst case) and 0.02 nm with the 2430:1 ratio neglecting any controller delay.

A bi-directional tracking mode exists, wherein, the motor is stepped to "recapture" a peak without losing the signal, which has moved slightly, perhaps 0.2 nm due to temperature changes. The tilt drive is carefully, bi-directional stepped to "repeak" the signal without losing the signal. In this stepping mode, the gear motor is powered "on" for 0.01 sec. and "off" for 0.03 sec., to produce independent discrete steps each of which represents the worse case which is about 0.25° corresponding to about 0.01 nm of wavelength tuning change.

The stepping or tracking mode imposes the primary use of the friction drag brake mounted on the cam drive shaft. The brake assures that the load will stop or decelerate faster due to load friction than the gear motor stops with its 0.008 sec. time constant. In this way, the gear motor backlash of about three degrees is eliminated during stepping except when motion is reversed. The control algorithm handles the mechanism backlash during reversal ("turn around") operations, as discussed later.

Since the filter tilt bracket rotates "cyclically" through only about six degrees and passes through zero velocity twice, the "tilt angle" reference position code wheel is typically located on the driving cam which rotates much faster (at relatively constant angular velocity) than the tilt bracket. Further, this code wheel could be such as to divide the forward scan operating region into sectors to assist the controller in "filter selection" during a number of control algorithms. The design approach implemented used a single LED/receiver pair to simply flag the beginning and end of the normal (forward) scan operating region during which optical power may be sampled.

The use of drive gear motors in the system may be represented by the following equations while referring to FIG. 8:

$$V = IR_a + L\left(\frac{dI}{dt}\right) + K_v\dot{\theta} \quad \text{Electrical}$$

$$T_g = K_T I = T_f + K_f\dot{\theta} + J\ddot{\theta} \quad \text{Mechanical}$$

Where $K_T$=Torque Constant (kg cm/amps)

$K_V$=Back E.M.F. Constant (Volts Sec)

$K_f$=Viscous Friction Constant (kg cm sec)

J=Total Polar Moment of Inertia (kg cm sec$^2$)

$T_f$=Coulomb Friction and Load Torque (kg cm)

$T_g$=Internally Generated Torque (kg cm)

Stray capacitance effects are, typically, negligible and have therefore been ignored in the electrical equation. A further practical simplification is made by noting that the mechanical time constant of the motor (0.01 sec) is 2500 times larger than the electrical time constant (L/R). With no measurable loss in dynamic analysis accuracy, the inductance can assumed to be zero. Inductance effects are only of interest in the drive circuit design.

Motor velocity solutions to the governing equations are as follows:

From Start:

$$\dot{\theta} = \frac{V}{K_V}\left[1 - \frac{T_f}{T_s}\right]\left[\frac{1}{1 + \frac{K_F T_m}{J}}\right][1 - e^{-(KF/J + 1/Tm)t}]$$

Stopping From $\theta_{ss}$:

$$\dot{\theta} = \theta_{ss} e^{-(KF/J + 1/Tm)t}$$

Where $$\frac{K_T V}{R_a} = \text{Stall Torque}$$

$T_f$ = Load + Friction Torque $$T_m = \frac{JR_a}{K_T K_V} \quad \text{(Mechanical Time Constant)}$$

$t$ = Time

The steady state torque vs. speed characteristics is depicted by FIG. 9. Examination of the equations show how constant friction plus load torque modify the theoretical frictionless steady state no load speed $$\frac{V}{K_v} \quad \text{by the} \quad \left(1 - \frac{T_f}{T_s}\right)$$

term where $T_s$ is the theoretical internally generated torque at zero speed $$\left(\frac{K_T V}{R_a}\right).$$

The steady state speed is further reduced by the viscous friction term $$\left(1 + \frac{K_w T_m}{J}\right)^{-1}.$$

Viscous friction also reduces the effective time constant by the relation:

$$\frac{1}{T'} = \frac{1}{T} + \frac{K_w}{J} \quad \text{where } T = \frac{JR_a}{K_T K_v} \quad \text{(standard time constant)}$$

The principal source of the viscous friction is the shearing of the light grease lubricant in the multistage gear box. Fixed or "coulomb" friction results from both gear box and motor brush drag. An evaluation of both as a function of temperature was made by measuring steady state speed at fixed supply voltage and, separately, at measured motor currents as shown in FIG. 10. The slopes of the current versus speed curves yield the coulomb or fixed friction $T_f$. Using FIG. 10 data and computing the change in $R_a$, the effective motor time constant varies from 0.0081 sec at 5° C. to 0.0103 at 40° C. Further, the equations predict a steady state speed change over this temperature range of 11%. Fixed voltage steady state speed measurements over the 0° C. to 50° C. range compare very close with the predictions.

With the above equations and values for $K_w$ and $T_f$ basic start, stop and single "on pulse" distances can be computed. These are illustrated in FIG. 11 and will be used to quantify carousel drive and tilt drive dynamics. First, however, an important observation is made in the manufacture's gear motor specifications. The time constant for the 1770:1 gear motor is the same as for the basic motor itself. This indicates that the reflected inertia of the gear box is very small relative to the inertia of the motor. Further, calculations of the inertia (J) of the carousel and the tilt bracket assembly show that when reflected through the gear box to the motor shaft the 1770:1 reduction renders the reflected load inertia negligible. For example, the motor inertia is about 8000 times the reflected carousel inertia. From an inertial point of view, the drive dynamics are totally dominated by the motor. This has a number of important implications when considered with the absence of any hard stops in the mechanism design:

1. It is shown below that small load friction torques are required for dynamic reasons. This reflects back to the motor as only 3 ma of current. This is about one third of the typical gear motor internal friction. The load acceleration torque reflects back as only 0.7 microamps. Since the stall torque current $$\left(\frac{V}{R_a}\right) \text{ is 96 ma,}$$

the motors will be running essentially loaded only by their own internal coulomb and viscous friction and inertia.

2. Start or stop times are about 30 msec or three time constants. Since a complete carousel rotation or tilt bracket cycle is 14.2 seconds, any sizable motion will be at steady state speed conditions where maximum run currents are about 18 ma (including load friction). The associated internal $I^2R$ losses are 8.4 milliwatts which produce an internal (armature) motor temperature rise of only 1.2° C. The motor run power is 45 milliwatts. As such negligible self heating is involved in the slew mode. This issue will be readdressed later in the step mode.

3. An examination of the gear motor specifications shows that internal spur gear loading effects limit the gear box output torque to the equivalent of 20 ma motor current. Stall torque is nearly five times this amount. Because of the reflected inertia effects, the largest part of generated torque, during start or stop transients, is used to accelerate the motor rotor. This torque never leaves the motor housing, i.e., it never reaches the gear box input. The residual torque, i.e., less than 20% of the total generated is delivered to the gear box input. As such, no current limiting is required. This is the main reason both carousel and tilt drives are designed with no positive mechanical stops.

Figure 18:
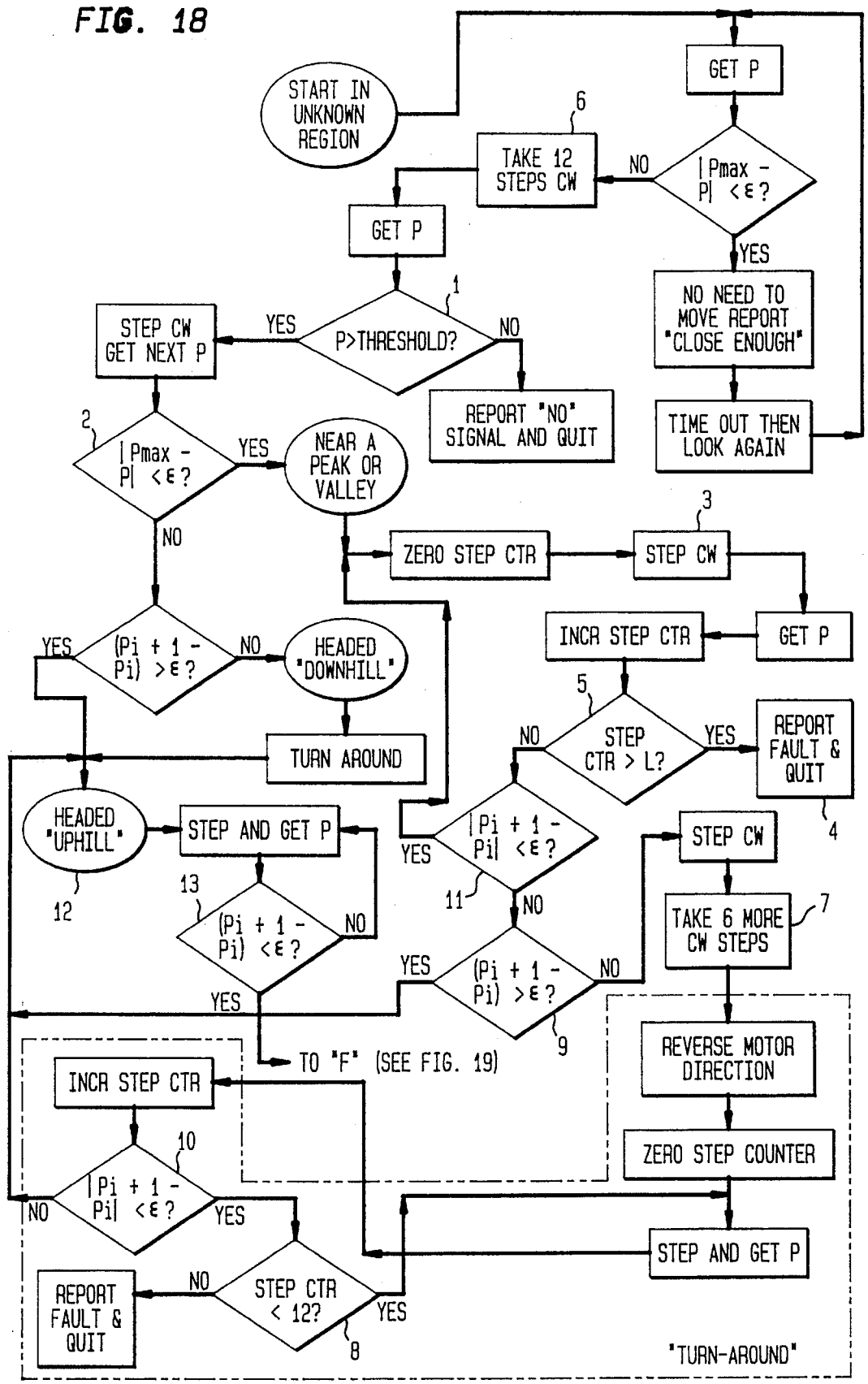
FIG. 18 is a flowchart of the step mode signal tracking algorithm.
Figure 19:
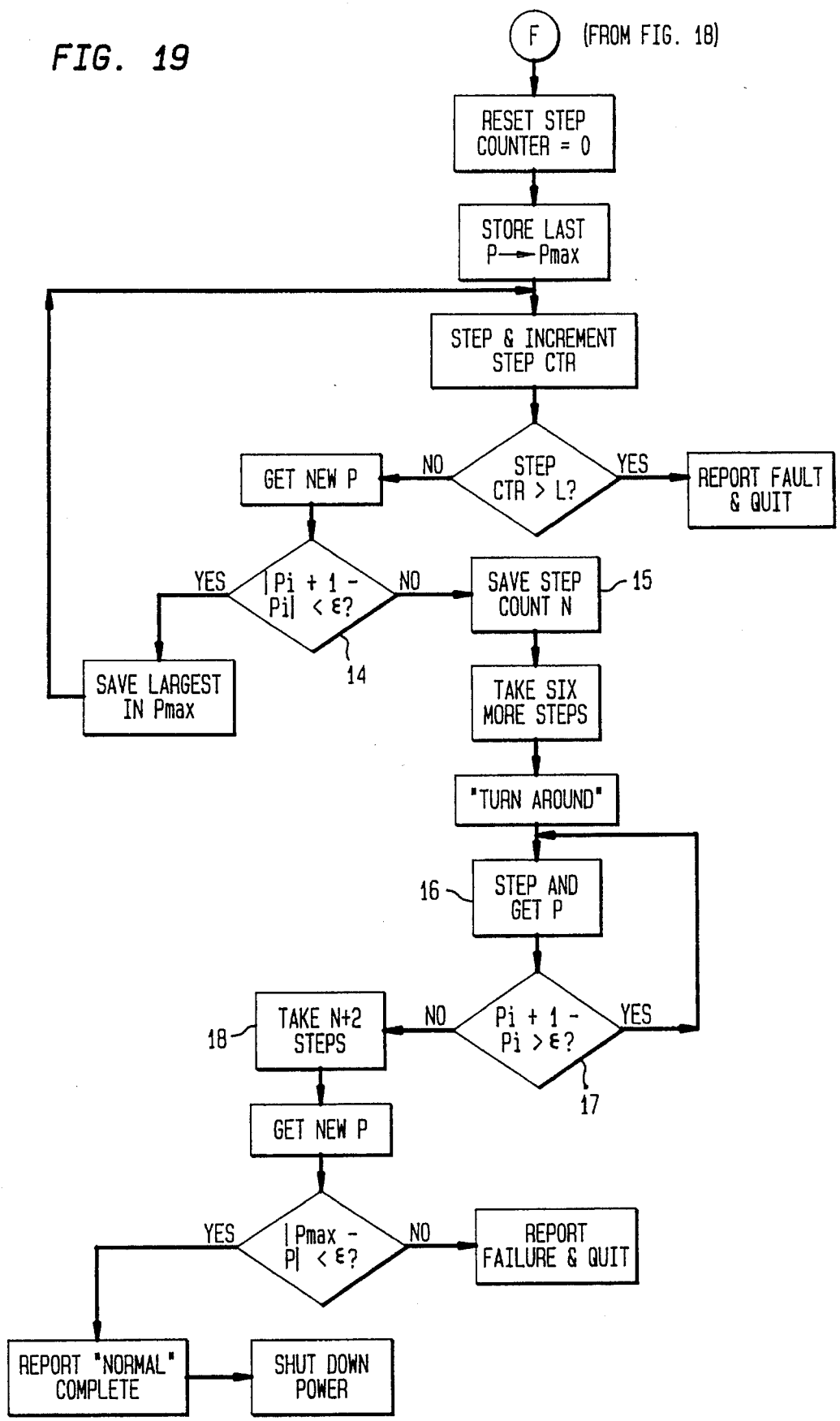
FIG. 19 is a flowchart of the step mode signal tracking algorithm as continued from FIG. 21.

Some operational scenarios, particularly signal tracking, may be best handled by a stepping mode (FIGS. 18–19). Again, from FIG. 11, the step motion resolution for an arbitrary 0.01 sec. is 0.007°. Clearly, the step resolution can be made arbitrarily small by shortening the full voltage "ON" pulse width.

As a reference point, the maximum step rate to produce complete individual steps is about 25 steps/sec. Under these conditions, the average $I^2R$ internal motor loss can be computed from the results illustrated in FIG. 11 by recalling that for the first part of the step ("ON" phase) the motor current is $$\frac{V}{R_a} e^{-t/T}$$

since the inductance is ignored. At 0.01 sec, the speed is 0.63 $(\theta_{ss})$ and the terminal voltage is switched to zero. Therefore, the back emf voltage $(K_v \theta)$ as well as the friction drive the motor to zero. For a 0.01 sec step, the $I^2R$ loss stepping 25 step/sec is 0.115 watt which produces an internal rise of 16.1° C. This is still quite reasonable under continuous stepping. From the above, since the individual step resolution can be made arbitrarily small there appears no need to employ pulse width modulation (PWM) to achieve intermediate speeds. The added electronic noise associated with PWM can be avoided with no performance cost.

Mechanism Backlash

The gear motor specifications indicates that backlash at the gear box output is about 3°. Rather than complicate the mechanism with conventional "spring-loaded" anti-backlash devices, the backlash is handled by insuring that the driven load has sufficient friction such that the load would stop or decelerate faster due to its own friction than the motor stops due to its time constant. Then for unidirectional motion, the load position, start and stop distances and velocity are accurately calculated from the motor dyanics above. Where motion direction reversal is involved, the control algorithms can accommodate the backlash-about twelve steps. This is detailed in the step mode algorithm discussion presented below. Calculations indicate that the required friction for the carousel and filter bracket are respectively, 0.004 and 0.019 inch ounces, which are extremely small compared with available stall torque. No significant motor loading is involved here.

While on the subject of friction, its second function is to stabilize the mechanism under an operating vibration environment. To avoid carousel or tilt bracket position drift with linear vibration, the two subassemblies will be statically balanced about their respective rotation axes. However, if the equipment housing is not "isotopically" mounted, linear vibrations will induce torsional vibrations. Torsional vibrations will be passively countered with friction to avoid active control and power consumption.

Calculations are conducted assuming one G linear acceleration on one end of a six inch equipment housing with the other end fixed. This induces angular accelerations of up to 64 rad/sec$^2$. The friction torque levels required to stabilize the carousel and tilt bracket are, respectively, 0.007 and 0.027 inch ounces, again not enough to cause motor loading. One inch ounce is already calculated in the carousel to reference surface spring-loading to take out all "tilt producing" clearances.

Temperature Compensation—Filter Selection and Tuning

Figure 12:
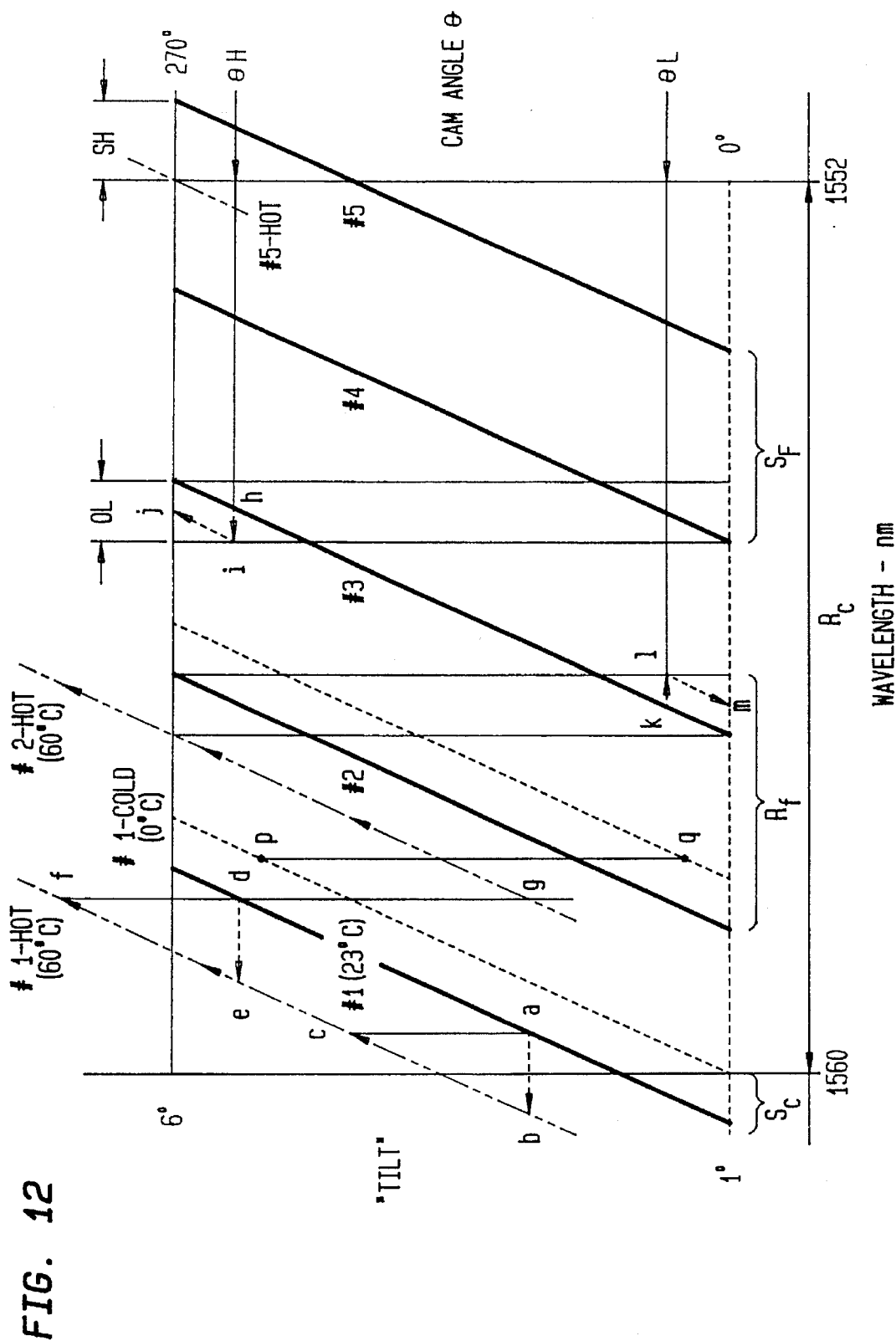
FIG. 12 is a graph illustrating an analysis of the temperature compensation requirements and tuning consideration.

An analysis of the temperature compensation requirements and tuning consideration is illustrated in FIG. 12 and leads to the minimum number of filter elements required and their design wavelength. The curves in FIG. 12 are linearized for clarity. While the numbers do not reflect the final tuning range and maximum tilt angle, the figure is instructive in demonstrating the considerations required for filter selection, including temperature effects. Further, the final temperature drift coefficient realized is only a third of that used in the example given. The curves in FIG. 12 reflect the following basic limitations.

1. Tilt angles less than one degree are not permitted because of reflection considerations.
2. Tilt angles are limited to about six degrees due to the 3 dB maximum insertion loss allowance.

Tuning for temperature compensation can be visualized by noting that the wavelength shift with temperature is linear and moves the curves in the directions shown in FIG. 12. Consider that at room temperature the MMTBPF is tuned to a point "a" using filter element number 1. If the temperature increases up to 60° C. the operating point, i.e., the effective filter passband center, shifts left to point "b". To compensate, the filter is tilted to point "c" bringing the operating point back to the same wavelength as point "a".

If a room temperature tuning point is selected at "d", a temperature increase to 60° C. would require tilting to point "f" to return to the desired wavelength. This would increase loss above the 3 dB or 6° tilt angle limit. Therefore, a switch to filter element number 2 is required with an associated tilt angle reduction so that point "g" on the hot shifted number 2 curve, i.e., the desired wavelength is achieved.

The requirement of the MMTBPF is to be tunable anywhere in the tuning range $R_c$ at any temperature in a specified range, which is assumed to be 0° C. to 60° C. Accordingly, with reference to FIG. 12, the two extreme filter elements can be placed as follows:

1. With reference to the left end of the tuning band (filter #1), a drop in temperature shifts the curve to the right (#1—COLD). This is the worst case in that no other filter elements "left" of this point are available. Therefore, the room temperature (23° C.) placement at a 1° tilt angle must be further left of the end of the tuning range by an amount equal to the product of the "cold" temperature change and the filter temperature coefficient (0.02 nm/° C.). This is labeled as the cold shift "$S_c$" in FIG. 12.
2. Similarly, the right end of the tuning band must be reached by a filter element at high temperature. The 37° C. "hot" temperature change forces the placement of the "right" end filter (hot shift "$S_H$") to the right of where its "hot" position just reaches the end of the required tuning range with the maximum allowable loss.

This has the effect of extending the tuning range by $S_c$ plus $S_H$. In general, if the design tuning range is $R_c$ and the total temperature range is $\Delta T$, the design range of the set of filter elements must be $R_c + \Delta T\,K_T$, where $K_T$ is the temperature coefficient in nm/° C. A set of n filter elements must cover this range. For an individual element tuning range of $R_f$, the minimum number of elements required is:

$$n = [R_c + \Delta T\,(K_T)] \div R_f$$

Obviously, "n" must be a whole number so the next highest whole integer is used. This permits the elements to be spaced ($S_F$) such that some "overlap" is provided. From FIG. 12 the size of the overlap (OL) is:

$$OL = \frac{1}{n-1}\,[nR_f - (R_c + S_c + S_H)]$$

It is the overlap which permits the MMTBPF to be tuned to any wavelength at some initial temperature, after which the peak can be tracked over a limited temperature range without changing filter elements, i.e., without losing the signal. Refer to FIG. 12, and note the overlap shown for filter elements 3 and 4. Note that the maximum tuning point "h" on filter No. 3 is defined where the center of the overlap intersects the filter tuning line.

A temperature increase that shifts the operating point "i" can still be compensated by tilting the filter to move the operating point to "j". That is back to the desired wavelength but at maximum allowable loss. Therefore, one half of the overlap defines the distance that the filter can thermally drift before the compensating tilt exceeds the loss limit. At the other end of the filter tuning range, point "k" is similarly defined from the overlap between filter elements 2 and 3. The reduced tuning range to allow for tracking without signal loss over a limited temperature range called "tracking temperature range" is, then, the wavelengths between the tuning points "h" and "k". Any tuning point between "h" and "k" will have a wider tracking temperature range, the maximum range being for a point halfway between "h" and "k". The total tracking temperature range is, then, the overlap divided by the $K_T$ (nm/° C.) temperature coefficient for the worst case tuning points, such as "h", "K", etc. Alternately, the required tracking temperature range and temperature coefficient determine the required overlap.

For the case where the filter tuning range is 1.75 nm, i.e., maximum loss allowed is 3 dB, and the temperature range ($\Delta T$) is 60° C., it can be shown that with the end filters placed as described above, an additional 3.25 filters, i.e., four filters are required to fill the gap (six filters total). A proposed compromise in order to reduce filter count allows a tuning loss of 3.25 dB. This provides for a filter tuning range ($R_f$) of 2.25 nm. A five filter carousel with filters spaced at 1.737 nm, therefore, provides an overlap of (2.25−1.737) or 0.51 nm. This allows a tracking temperature range of ±12.8° C., a 12.8° C. temperature change in either direction after initial tuning for a 0.02 nm/° C. coefficient.

Another important consideration is that of the manufacturing tolerance on the center wavelength for each filter element. If, for example, a tolerance of ±0.5 nm is assumed, then the design overlap (OL in FIG. 12.) must equal twice this manufacturing tolerance, i.e., 1.0 nm, plus the amount required for temperature tracking. Further, the design point for the end filters must be extended by an amount equal to this manufacturing tolerance. Denoting this tolerance by ±t, the relationship between tuning range ($R_c$), filter count (n), overlap (OL), temperature drift ($S_c$ and $S_h$) becomes:

$$OL = \frac{1}{n-1}\,[nR_f - (R_c + S_c + S_H + 2t)]$$

Clearly, the manufacturing tolerance and temperature drift allowance have a potentially large effect on the number of filters required to cover a design span. This is best seen by rearranging the above to see how the potential tuning range ($n\,R_f$) is reduced to the usable tuning range $R_c$:

$$R_c = n\,R_f - [(n-1)\,OL + S_H + 2t] < n\,(R_f - 2t) - (S_c + S_H)$$

If a 10° C. tracking temperature range requirement is assumed, the 0.0065 nm/° C. measured coefficient employed and a ±0.1 nm center wavelength manufacturing tolerance allocated, then the design for the 1560 to 1548 nm region would be defined by:

1. $S_c + S_H = (.0065 \text{ nm/°C.})(60° \text{ C.}) = 0.39 \text{ nm}$
2. $OL = 2(0.1) + 2(.0065 \text{ nm/°C.})(10° \text{ C.}) = .33 \text{ nm}$
3. $R_c = n R_f - [(n-1)(0.33 \text{ nm}) + .39 + 0.2]$
   $R_c = (1560 - 1548) = 12 \text{ nm}$
   $R_f = 2.5 \text{ nm}(1.5° \text{ to } 6.5° \text{ tilt range})$ From the above n is 5.6. Clearly, n must be rounded up to 6 or down to 5 in which case either the manufacturing tolerance must be tightened and/or the tracking temperature range reduced.

Tuning Control Programs—Signal Peaking

Figure 13B:
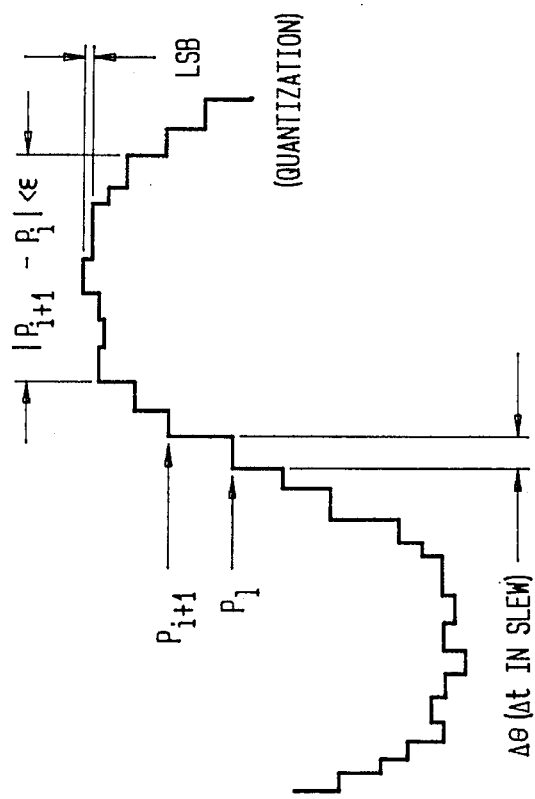
FIG. 13A illustrates a representation of the output analog circuitry which measures the short term optical (envelope) power of the tunable bandpass filter output and FIG. 13B illustrates the output as time sampled by an A/D converter.
Figure 13A:
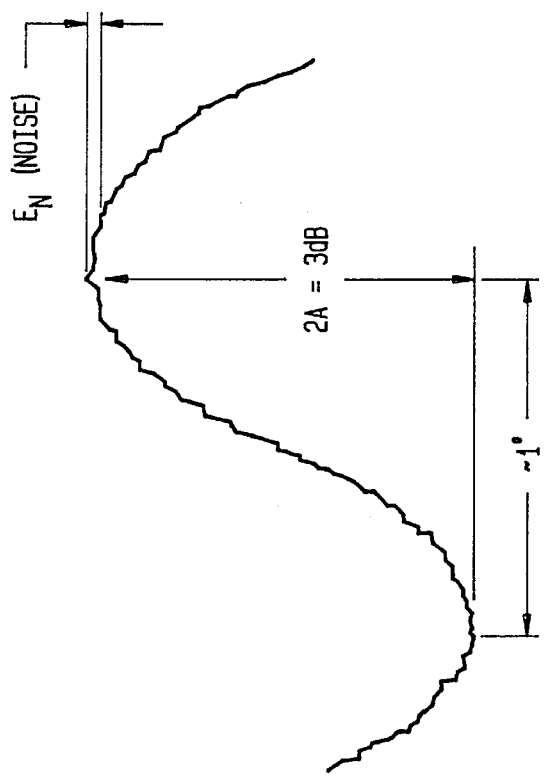

Generally, any signal peaking processes employing digital hardware faces the generic task illustrated in FIGS. 13A and 13B. FIG. 13A is a representation of the output of analog circuitry which measure the short term optical envelope power of the MMTBPF output. As the figure implies, about 3 dB amplitude swing is expected when tuning from one channel to another spaced about 2 nm away. Some level of the system noise ($E_n$) is associated with the baseline signal.

Typically, this analog signal is digitized in some A/D converter and time sampled at a given sample rate. As a result of the width (number of bits) of the A/D converter, sample rate and equivalent analog noise on the signal, the digital representation of the anticipated signal is as shown by FIG. 13B.

The signal can be divided into two zones:
1. Substantially away from peaks or valleys where each successive sample has an amplitude larger or smaller than the previous by a reliable amount called $\epsilon$. This may be absolutely true for every sample or true in the presence of a sliding window which averages the last "n" samples.
2. Near the peaks or valleys where each successive sample has an amplitude within $\epsilon$ of the previous sample.

The detailed algorithms illustrated by the flow charts of FIGS. 14–19 for slew mode or step mode assume that the instantaneous true peak cannot be directly and reliably measured. Rather, with either continuous (slew) or unidirection stepping motion the point at which the signal enters and leaves the two regions can be observed as time from a "1°" tilt angle reference mark or number of unidirectional steps without backlash. The algorithms then find a peak or valley by unidirectionally measuring, either time or step count, the boundaries of the "less than $\epsilon$" zone and declaring the peak to be:
1. Positioned midway between the boundaries or transitions.
2. Equal in amplitude to the largest, or smallest for valleys, sample observed between the boundaries or transitions.

The above is equivalent to measuring the amplitude of the peak by simple amplitude measurements, i.e., "retain the largest sample", and locating the peak by "functionally differentiating" the signal and finding the derivative zero cross-over point (halfway between "<$\epsilon$" boundaries).

A detailed review of the algorithms illustrated by the flow charts of FIGS. 14–19 will show that mechanism backlash is handled by the following in the step mode:
1. When leaving the "<$\epsilon$" region, do not stop after the first observed ">$\epsilon$" observation. Take several six more steps where each gives a ">$\epsilon$" successive sample difference.
2. Reverse the direction of steps, noting that the first several steps after reversing, up to about 12, show the "<$\epsilon$" results for successive steps due to gear motor and coupling backlash. Once about six ">$\epsilon$" steps are recognized, backlash has been removed and the next occurrence of "<$\epsilon$" results indicates true re-entry into the signal peak region. This logic must be exercised on each controlled motion reversal.

Filter Element Positioning

Figure 15:
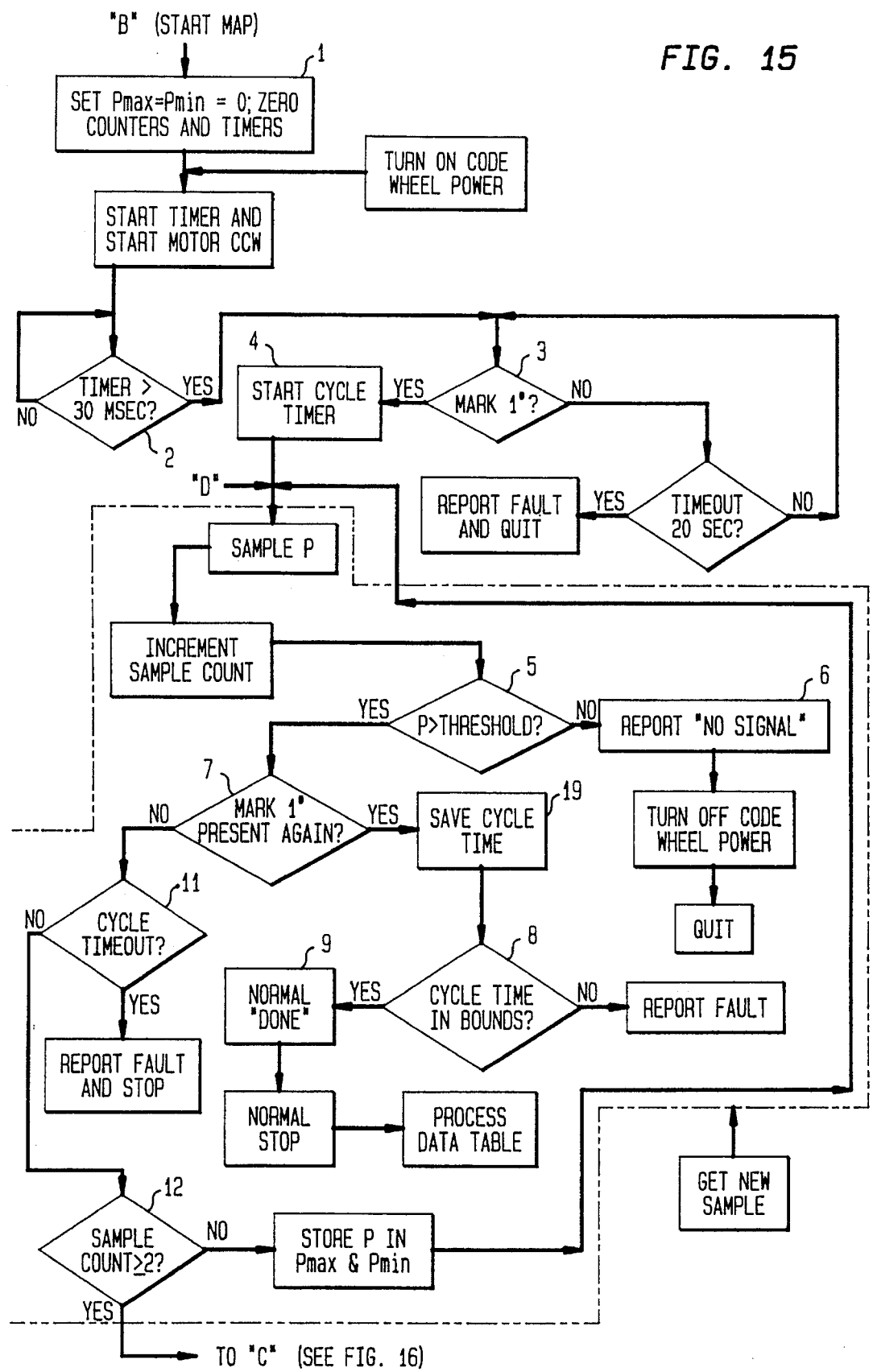
FIG. 15 is a flowchart of the map algorithm (slew speed) as continued from FIG. 17.
Figure 16:
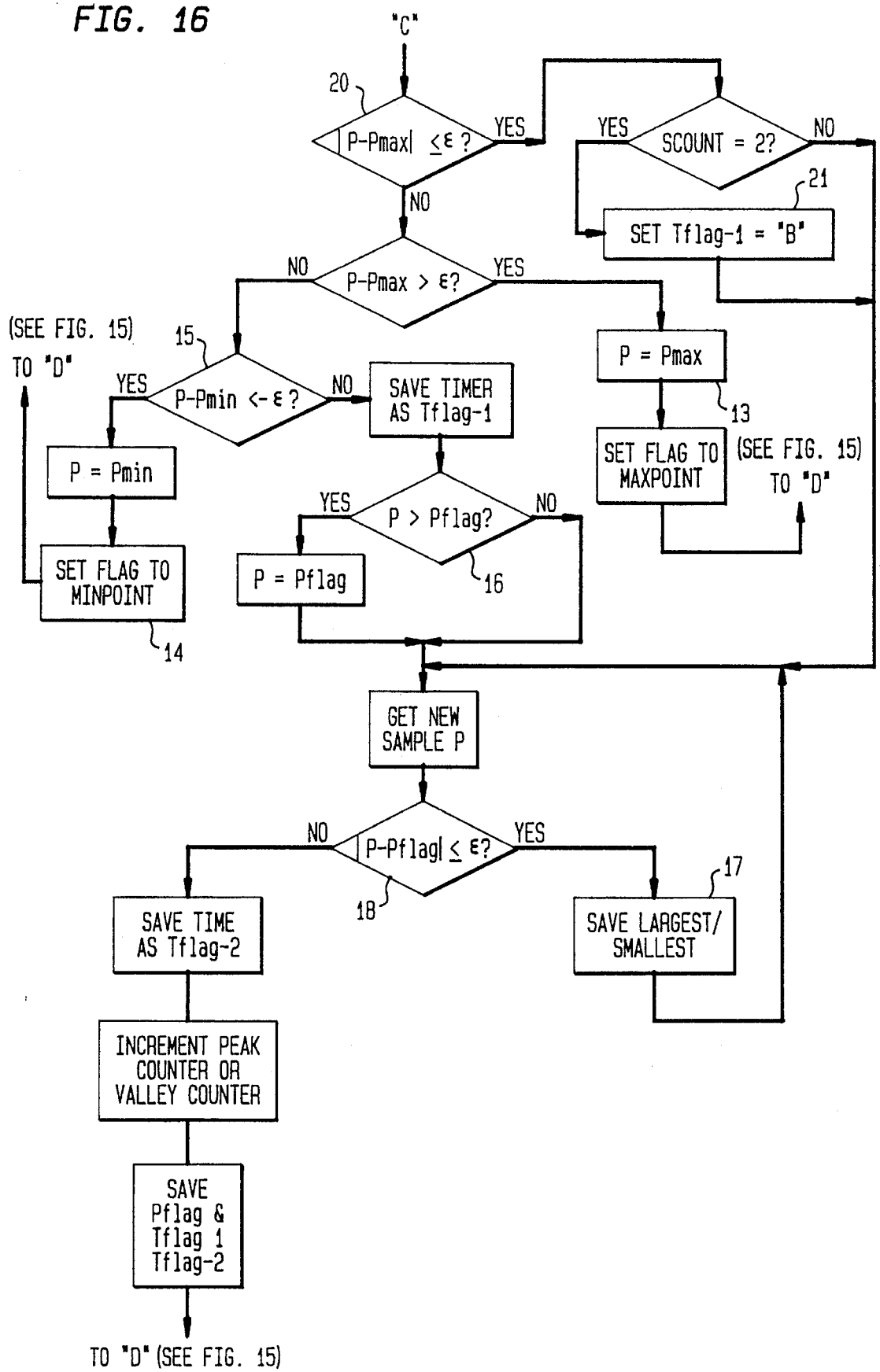
FIG. 16 is a flowchart of the map algorithm (slew speed) as continued from FIG. 18.

The filter element positioning and map algorithms are shown by FIGS. 14–16.

The first algorithm associated with positioning a filter element is shown by FIG. 14. Starting with a selected filter number from a host program, the algorithm either unconditionally starts the carousel clockwise or if the current position is already reliably known makes a "shortest distance" decision on the best start direction. The currently coded software employs the unidirectional algorithm. A change to the "smart search" version would cut the average access time from 7 seconds to 3.5 seconds. Following a motor start command and the 30 msec delay to allow full slew speed to develop, the position is sampled in a way to force the observation of eight consecutive all zeros between filter elements, before any non-zero position is considered. This avoids any wrong decisions due to carousel code wheel bit skew.

Following eight minimum all zeros, the next non-zero sample initiates a time; the delay for which is greater than the "off to on" code wheel bit skew. This software implemented electronic deskew is used to relieve the need for precise optical/mechanical alignment. Following the "deskew" delay, the position is interrogated to see if the desired position is true. If it is, a stop command is issued, a 30 msec delay initiated to allow for stop dynamics, i.e., cease all motion, and the position is interrogated again to ensure validity. The code wheel power is then turned off to reduce carousel power to zero.

Once a particular filter element has been selected and positioned by the carousel drive algorithm, it is scanned or mapped for the presence of any WDM signal peaks. The scan or map algorithm is shown by FIGS. 15 and 16. The algorithm basically runs the tilt motor at full speed in one direction and samples at a fixed rate the measured optical power between the scan start and stop points defined by the "off to on" and "on to off" transitions of the one bit cam code wheel. These points correspond to 1.5° and 6.4° of tilt defined by relative cam angle of 35° and 140° where 1° tilt corresponds to 0° cam angle; the physical turn around point.

The coded software also stores each optical power and indexed time coordinate sample pair for development and demonstration purposes. On command, the scan is displayed showing MMTBPF optical power vs. scan time. Samples are taken every 50 msec. The 50 msec sample period is a limitation of the development controller software/hardware complex. Another design could employ faster scan velocities if faster sample rates are provided. Multiple peaks in one filter element scan are accommodated with the ability to tune to any designated one.

Processing the data includes calculating and reporting the estimated wavelength $\lambda$ of any observed peak. This process is explained above and consists of using the following:
1. The observed relative cam angle $\theta_c$ (from timing data) to the observed peak.
2. Fixed mechanism parameters (mechanism dimensions).

3. Estimate of tilt angle (β) from the observed cam angle ($\theta_c$). First β estimate is added to $\theta_c$ and equation is iterated once to produce very accurate β estimate.

4. Calibrated λ vs. β characteristics of each filter element.

While not an official requirement, an accurate estimate of λ is provided and should be useful in managing any signal peaks which appears on two adjacent filter elements due to tuning overlap.

With reference to FIGS. 15 and 16, the mapping algorithm is explained below with a particular emphasis to the circled reference numerals. In step 1 of FIG. 15, $P_{max}$ and $P_{min}$ are initialized to zero and will store the largest and smallest optical envelope power samples. PC and NC are counters that keep track of the number of peaks and valleys encountered. A timer provides a 30 msec wait to ensure the motor achieves full speed (step 2). In step 3, there is a wait for the 1° index to appear under full speed conditions.

The start scan timer is started in step 4. A sample of optical power is obtained in step 5. If P is less than some threshold, the algorithm reports a no signal and quits execution (step 6).

In step 7, the algorithm checks to determine if a scanning cycle has finished. Next, it checks to determine if scan time is between normal limits L1 and L2 (step 8). If yes, then scanning has been completed in normal time (step 9), and one can stop and process or otherwise use data.

However, if scanning has not been completed (step 10), the normal process is continued. If the scan cycle time grows beyond limits, report the fault and stop (step 11). Step 12 insures there are real samples to compare. If so, get a new minpoint (step 14) or a new maxpoint (step 13). If $|P-P_{Flag}|<\epsilon$ is true (step 17) then keep the largest, (Flag–Maxpoint) or smallest (Flag–Minpoint) sample. Keep getting samples in the $|P-P_{Flag}|<\epsilon$ zone (step 17). If $|P-P_{Flag}|<\epsilon$ is not true (18), then leave this zone.

$T_{Cycle}$ in step 19 is a real time calibration on motor speed and accounts for motor speed variations due to:

long term wear effect battery voltage friction temperature motor to motor variations At step 20 ($|P-P_{max}|<\epsilon$) the first time through $P_{max}=P_{min}=$ first P sample and sample count equals 2. Scan starts in the $|P_i-P_i|<\epsilon$ zone (step 21). The "left most" time boundary may be essentially 0 unless the mechanism is set to always start at some negative angle. $T_{flag-1}$ and $T_{flag-2}$ are the boundaries of the $|P_{it1}-P_i|<\epsilon$ region.

Tuning (Slew Mode) To Mapped Peak

Figure 17:
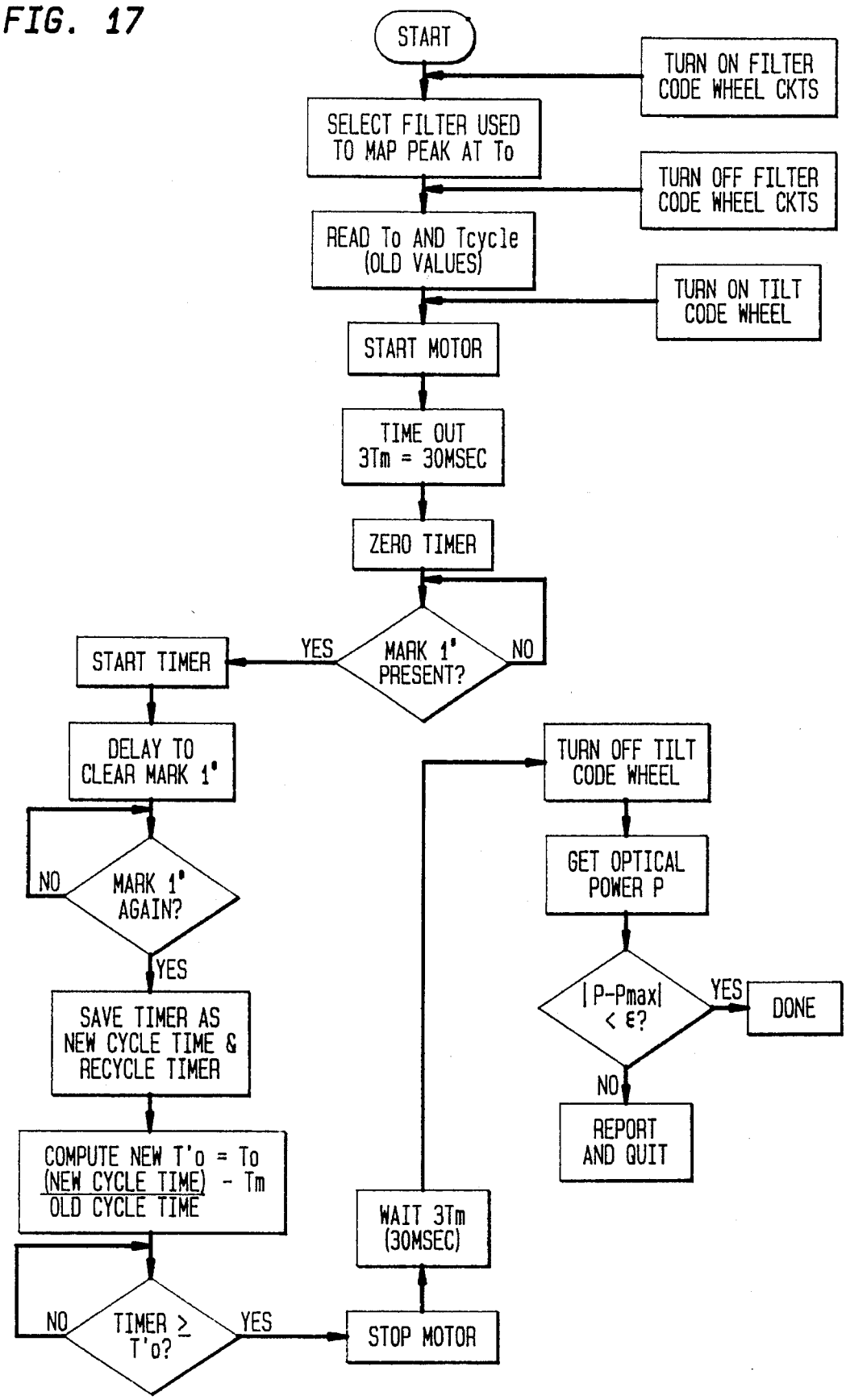
FIG. 17 is a flowchart of the "dead reckon" temperature compensation method.

FIG. 17 is the algorithm used to tune the MMTBPF to any previously mapped peak. It simply gets the tilt motor to full slew speed, measures the new (current) full cycle time and computes a new peak coordinate time $T_o$ which:

1. Corrects for temperature, voltage or other induced motor speed (cycle time) changes since the desired peak was mapped.

2. "Leads" the desire stop point by an amount which should result in skidding to a physical stop right on the peak.

The algorithm then issues a stop command, waits for the transient to complete (three motor time constants are allocated), turns off the cam code wheel power and remeasures the optical power to ensure it is close to the observed (mapped) value.

Step Mode Tracking

Once a signal has been acquired by scanning or mapping followed by slew tuning, the MMTBPF is normally powered down and sits in the tuned position isolating and passing the tuned individual WDM "channel". If temperature changes, the effective MMTBPF tune point shifts (there may also be shifts in the WDM signal presented at the input of the MMTBPF). The tracking algorithm shown in FIGS. 18 and 19 provides a means to "tweak" (retune) the MMTBPF to repeak the signal without losing it, as would happen if a rescan were initiated.

At the top of FIG. 18, a short sample loop is run to see if the optical power has changed since the last tuning by more than some value ε. If so, the tracking loop is initiated. Alternately, a measured temperature change could be used to initiate tracking if a temperature sensing device is provided in or near the MMTBPF. Once initiated, twelve steps are taken to eliminate any backlash assuming the last direction of driver motion is not remembered, and the individual step and sample process is started.

Basically, the algorithm steps and samples to find the boundaries of the $|P_{i+1}-P_i|<\epsilon$ region, measuring its width by counting the number (N) of unidirectional steps between the boundaries. It then reenters the region a distance of N/2 undirection steps. Note that the "turn around" routine takes out the gear motor/coupling backlash when reversing directions.

A detailed review of the coding which follows with reference to the circled reference numerals in FIGS. 18 and 19 reveals that "step size" has been adjusted by making several software steps equal to one algorithm step:

1. Is a usable signal present?
2. Find starting condition.
3. Head for edge of $|P_{i+1}-P_i|<\epsilon$ area.
4. Guard against an infinite loop.
5. At edge of $|P_{i+1}-P_i|<\epsilon$ area.
6. Takes out any backlash.
7. Provides about six steps of $|P_{i+1}-P_i|>\epsilon$ to recognize after taking out backlash.
8. Loop to remove backlash.
9. Coming downhill from peak area.
10. Now headed "uphill" in a $|P_{i+1}-P_i|>\epsilon$ region.
11. Headed "uphill" away from a valley.
12. In a $(P_{i+1}-P_i)>\epsilon$ (headed uphill) region.
13. Just entered $|P_{i+1}-P_i|<\epsilon$ near a peak.
14. Stepping through $|P_{i+1}-P_i|<\epsilon$ peak region.
15. Peak region is "N" steps wide.
16. Headed back "uphill".
17. Just reentered peak region.
18. Position filter half way through peak region.

This is the best peak position estimate.

It will be understood that each of the elements described above, or two or more together, may also find a useful application in other types of constructions differing from the type described above.

While the invention has been illustrated and described as embodied in an adjustable filter selection device for filtering a MM WDM signal operating in the 1548 to 1560 nm region, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for receiving the passband of an optical beam carrying multimode, wavelength division multiplexed optical signals, where each wavelength of said signals has peaks defining a bandpass region, where said region has maximum optical power, and tuning said bandpass region, said method comprising:

(a) selecting one of a plurality of optical filter elements arranged in a carousel where each filter element has a different center wavelength for passing at least one wavelength from a plurality of wavelength division multiplexed signals;

(b) centering the selected filter element in the path of the optical beam;

(c) positioning the selected filter element to tune said bandpass region of said at least one selected wavelength; and (d) tracking the tuned bandpass region of said selected at least one wavelength.

2. The method according to claim 1, wherein the selected filter element is positioned for passing a two millimeter diameter optical beam.

3. The method according to claim 1, wherein the wavelengths of the optical beam are in the range of around 1548 to around 1560 nm.

4. The method according to claim 3, wherein the adjacent wavelengths are spaced approximately 2 nm apart.

5. The method according to claim 1, wherein the wavelengths are within 12 nm of one another.

6. The method according to claim 1, wherein a processor controlled motor is used to drive the carousel for centering and positioning the selected optical filter element.

7. The method according to claim 1, wherein the optical filter elements are circular, each having a diameter of around five millimeters.

8. The method according to claim 7, wherein the tilt angle of the selected optical filter element can be physically changed by a control motor to allow isolation of a single wavelength signal from the incident NDM signal.

9. The method according to claim 1, further comprising the steps of:

(e) determining with an optical receiver feedback whether the selected filter is in position to tune the bandpass region of said one wavelength; and (f) controlling with a processor and associated stored programs said selected filter element to get maximum transmission of said bandpass region of said one wavelength through said selected filter element.

10. The method according to claim 9, wherein said processor and associated programs repeatedly checks to determine whether the selected optical filter element stays in position.

11. The method according to claim 10, wherein said processor and associated stored programs periodically issues commands to the carousel for selective rotation and scanning with a plurality of filter elements a wavelength spectrum region to determine if any wavelength division multiplexed optical signal peaks are present, wherein when any peaks are detected, said processor and associated stored programs issues commands to tune said bandpass region of said detected peaks, wherein said processor and associated stored programs proceeds to track said detected peaks without losing said one wavelength should said one wavelength or said selected filter element drift due to a temperature change.

12. The method according to claim 1, wherein the optical signals are collimated before said bandpass region of said one wavelength is tuned.

13. The method according to claim 12, wherein GRIN (Graded Index) lenses are used to collimate the optical signals.

14. The method according to claim 12, wherein aspheric lenses are used to collimate the optical signals.

15. The method according to claim 1, wherein each of said plurality of optical filter elements is a two or three cavity, multi-layer interference type.

16. A method for extracting a single channel electrical signal, said electrical signal having peaks defining a bandpass region, from an optical beam carrying multimode, wavelength division multiplexed optical signals, in a system having a plurality of optical filter elements, said method comprising:

(a) selecting one out of a plurality of optical filter elements where each filter element has a different center wavelength;

(b) positioning the selected filter element in the path of said optical beam;

(c) shifting the positioned optical filter element to tune said bandpass region of one of said multimode optical signals to form said electrical signal; and (d) feeding said electrical signal to an analog to digital converter.

17. The method according to claim 16, wherein said multimode optical signals have wavelengths in the range of around 1548 to around 1560 nm.

18. The method according to claim 16, wherein said method further comprises:

(e) monitoring feedback measurements of optical power from the electronic converter; and (f) inspecting to detect wavelength shifts among said multimode optical signals and said signal.

19. The method according to claim 17, wherein said multimode optical signals have wavelengths spaced approximately 1–12 nm apart and centered around 1558 nm.

20. A system for receiving an optical beam carrying multimode, wavelength division multiplexed optical signals, where each of said signals has peaks defining a bandpass region, where said region has maximum optical power, and tuning said bandpass region, said system comprising:

signal peak detection means for detecting the presence of a peak of one of said wavelength division multiplexed signals;

selection means for selecting one out of a plurality of optical filter elements arranged in a carousel wherein each of said filter elements has a different center wavelength for passing said detected wavelength from a plurality of wavelength division multiplexed signals;

centering means for centering the selected filter element in the path of the optical beam;

positioning means for positioning the centered filter element to tune the bandpass region; and tracking means for tracking the tuned bandpass region without losing said detected wavelength should said detected wavelength or selected filter drift.

21. The system according to claim 20, wherein the optical filter elements are circular, each having a five millimeter diameter.

22. The system according to claim 20, wherein the plurality of optical filter elements each have an optical receiver feedback means for determining whether the selected filter element is in position.

23. The system according to claim 20, wherein the selected filter element is positioned in a manner such that a two millimeter diameter of the optical beam can transmit through the selected filter element.

24. The system according to claim 20, wherein the wavelengths of the optical beam are in the range of around 1548 to around 1560 nm.

25. The system according to claim 24, wherein the wavelengths are spaced approximately 1–12 nm apart and centered around 1558 nm.

26. The system according to claim 20, wherein said carousel includes seven filter elements.

27. The system according to claim 20, wherein each said filter element has a center wavelength in the range of around 1548 to around 1560 nm.

28. The system according to claim 20, further including means for limiting tuning loss to approximately 1 dB while maintaining insertion loss at less than 4 dB when positioning angle of said selected filter element is between 0 to 7 degrees.

29. The system according to claim 20, further including a motor and motor control means for driving the carousel for centering and positioning the selected optical filter element.

30. The system according to claim 20, further including means for collimating said optical signals before tuning the bandpass region.

31. The system according to claim 30, further including GRIN (Graded Index) lenses for collimating said optical signals.

32. The system according claim 30, further including aspheric lenses for collimating said optical signals.

* * * * *